(12) United States Patent
Yang et al.

(10) Patent No.: US 11,252,704 B2
(45) Date of Patent: Feb. 15, 2022

(54) SPATIALLY MULTIPLEXING PHYSICAL UPLINK CONTROL CHANNEL (PUCCH) AND SOUNDING REFERENCE SIGNAL (SRS)

(71) Applicant: QUALCOMM Incorporated, San Diego, CA (US)

(72) Inventors: Wei Yang, San Diego, CA (US); Alexandros Manolakos, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/431,973

(22) Filed: Jun. 5, 2019

(65) Prior Publication Data
US 2019/0380123 A1 Dec. 12, 2019

(30) Foreign Application Priority Data

Jun. 8, 2018 (GR) .............................. 20180100253

(51) Int. Cl.
*H04W 72/04* (2009.01)
*H04L 5/00* (2006.01)
(Continued)

(52) U.S. Cl.
CPC ...... *H04W 72/0413* (2013.01); *H04B 7/0613* (2013.01); *H04B 7/0697* (2013.01);
(Continued)

(58) Field of Classification Search
CPC .............. H04W 72/0413; H04W 76/27; H04L 5/0048; H04L 27/2626; H04L 27/2602; H04L 27/2611; H04L 5/0094; H04L 5/0051; H04L 5/0044; H04L 5/001; H04L 5/0023; H04L 5/005; H04B 7/0613; H04B 7/0697; H04B 7/0404; H04B 7/0413
See application file for complete search history.

(56) References Cited

U.S. PATENT DOCUMENTS 9,967,079 B2    5/2018  Noh et al.
2010/0128683 A1*  5/2010  Zangi ................... H04L 5/0051
                                               370/329
(Continued)

OTHER PUBLICATIONS

International Search Report and Written Opinion—PCT/US2019/035841—ISA/EPO—dated Aug. 1, 2019.
(Continued)

*Primary Examiner* — Harry H Kim
(74) *Attorney, Agent, or Firm* — Patterson+ Sheridan, L.L.P.

(57) ABSTRACT

A design is provided for spatially multiplexing uplink channels. A user equipment (UE) detects that a Physical Uplink Control Channel (PUCCH) and a Sounding Reference Signal (SRS) are to be transmitted simultaneously. The UE decides to spatially multiplex the PUCCH and the SRS for simultaneous transmission via different sets of one or more antennas. The UE determines time and frequency resources for the PUCCH and the SRS to avoid collision of at least a portion of the PUCCH with the SRS. The UE transmits the spatially multiplexed PUCCH and SRS using the determined time and frequency resources.

56 Claims, 17 Drawing Sheets

(51) Int. Cl.
    *H04B 7/06*        (2006.01)
    *H04L 27/26*       (2006.01)
    *H04W 76/27*       (2018.01)
    *H04B 7/0404*      (2017.01)
    *H04B 7/0413*      (2017.01)

(52) U.S. Cl.
    CPC ........ *H04L 5/0048* (2013.01); *H04L 27/2626* (2013.01); *H04W 76/27* (2018.02)

(56) References Cited

U.S. PATENT DOCUMENTS

| | | | | |
|---|---|---|---|---|
| 2012/0014349 | A1* | 1/2012 | Chung | H04B 7/0693 370/329 |
| 2014/0010126 | A1* | 1/2014 | Sayana | H04B 7/0619 370/280 |
| 2014/0307646 | A1 | 10/2014 | Chen et al. | |
| 2017/0033908 | A1* | 2/2017 | Hwang | H04L 5/0053 |
| 2017/0070277 | A1* | 3/2017 | Si | H04B 7/0626 |
| 2017/0374679 | A1 | 12/2017 | Park et al. | |
| 2018/0132229 | A1* | 5/2018 | Li | H04W 72/1268 |
| 2018/0227949 | A1* | 8/2018 | Tiirola | H04W 74/04 |
| 2018/0255543 | A1* | 9/2018 | Takeda | H04W 72/0446 |
| 2019/0158334 | A1* | 5/2019 | Kim | H04L 5/0037 |
| 2019/0174466 | A1* | 6/2019 | Zhang | H04L 5/0048 |
| 2019/0288808 | A1* | 9/2019 | Baldemair | H04L 5/0053 |
| 2019/0327759 | A1* | 10/2019 | Lee | H04L 5/00 |
| 2020/0021470 | A1* | 1/2020 | Sun | H04L 25/03821 |
| 2020/0045691 | A1* | 2/2020 | Park | H04W 72/0413 |
| 2020/0052835 | A1* | 2/2020 | Xiong | H04L 5/0007 |
| 2020/0163079 | A1* | 5/2020 | Choi | H04L 5/0064 |
| 2020/0177424 | A1* | 6/2020 | Noh | H04W 72/0413 |
| 2020/0280412 | A1* | 9/2020 | Qi | H04W 72/0453 |
| 2020/0336973 | A1* | 10/2020 | Niu | H04L 5/0053 |

OTHER PUBLICATIONS

Qualcomm Incorporated: "Discussion on Simultaneous PUSCH and SRS Transmission from Different Antenna Ports", 3GPP Draft; R1-1712769 Discussion On Simultaneous PUSCH And SRS Transmission From Different Antenna Ports, 3RD Generation Partnership Project (3GPP), Mobile Competence Centre ; 650, Route Des Lucioles, vol. RAN WG1, No. Prague, Czechia; Aug. 21-25, 2017, Aug. 20, 2017 (Aug. 20, 2017), XP051315581, 5 Pages, Retrieved from the Internet: URL:http://www.3gpp.org/ftp/Meetings_3GPP_SYNC/RAN1/Docs/ [retrieved on Aug. 20, 2017].

Sony: "Summary of SRS", 3GPP Draft; R1-1801085—Summary Of SRS V0.5.1, 3RD Generation Partnership Project (3GPP), Mobile Competence Centre ; 650, Route Des Lucioles ; F-06921 Sophia-Antipolis Cedex; France, vol. RAN WG1, No. Vancouver; Jan. 22-26, 2018, Jan. 26, 2018 (Jan. 26, 2018), XP051385338, 53 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 26, 2018], p. 9.

* cited by examiner

SPATIALLY MULTIPLEXING PHYSICAL UPLINK CONTROL CHANNEL (PUCCH) AND SOUNDING REFERENCE SIGNAL (SRS)

This application claims priority to Greek Provisional Application No. 20180100253, entitled "SPATIALLY MULTIPLEXING PHYSICAL UPLINK CONTROL CHANNEL (PUCCH) AND SOUNDING REFERENCE SIGNAL (SRS)", filed on Jun. 8, 2018, which is expressly incorporated by reference in its entirety.

TECHNICAL FIELD

Aspects of the present disclosure relate to wireless communications, and more particularly, to spatially multiplexing Physical Uplink Control Channel (PUCCH) and Sounding Reference Signal (SRS).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a User Equipment (UE). The method generally includes detecting that a Physical Uplink Control Channel (PUCCH) and a Sounding Reference Signal (SRS) are to be transmitted simultaneously; deciding to spatially multiplex the PUCCH and the SRS for simultaneous transmission via different sets of one or more antennas; determining time and frequency resources for the PUCCH and the SRS to avoid collision of at least a portion of the PUCCH with the SRS; transmitting the spatially multiplexed PUCCH and SRS using the determined time and frequency resources.

In an aspect, the detecting includes detecting that the PUCCH and the SRS are configured or scheduled to be transmitted in a same OFDM symbol.

In an aspect, the portion includes a Demodulation Reference Signal (DMRS).

In an aspect, determining the time and frequency resources includes determining different time and frequency resources for the DMRS and the SRS.

In an aspect, the PUCCH is according to PUCCH Formats 1, 3 or 4.

In an aspect, determining the time and frequency resources includes determining that the SRS and the DMRS are to be transmitted on different OFDM symbols.

In an aspect, determining the time and frequency resources includes determining the SRS is to be transmitted on the same OFDM symbol in a different resource block than the DMRS.

In an aspect, determining the time and frequency resources includes determining the SRS is to be transmitted on the same OFDM symbol and in a same resource block as the DMRS, wherein the SRS is scheduled on resource elements (REs) not scheduled for the DMRS.

In an aspect, the PUCCH is according to PUCCH Format 2.

In an aspect, detecting that the PUCCH and the SRS are to be transmitted simultaneously includes detecting the SRS is to be transmitted on the same OFDM symbol in a same resource block as the DMRS.

In an aspect, determining the time and frequency resources includes determining a comb pattern for the SRS same as a comb pattern used for the DMRS; and determining the resources for the SRS based on the determined comb pattern on subcarriers not occupied by the DMRS.

In an aspect, detecting that the PUCCH and the SRS are to be transmitted simultaneously includes detecting that at least a remaining portion of the PUCCH and the SRS are configured to be transmitted on a same OFDM symbol of a same resource block.

In an aspect, determining the time and frequency resources includes determining the same OFDM symbol of the same resource block for transmission of the remaining portion and the SRS if the SRS is at least one of X resource blocks wide or Y times wider than the PUCCH.

In an aspect, values of X and Y are determined based on at least one of a SRS use case or a format of the PUCCH.

In an aspect, the value of X and Y are configured via Radio Resource Control (RRC) signaling.

In an aspect, determining the time and frequency resources further includes determining a puncturing pattern for the SRS; and determining the resources for the remaining portion by puncturing resource elements (REs) scheduled for the SRS based on the puncturing pattern.

In an aspect, the puncturing pattern is based on a format of the PUCCH.

In an aspect, the determining further includes rate matching transmission of the SRS around transmission of the remaining portion.

In an aspect, the remaining portion includes uplink control information (UCI).

Certain aspects provide a method for wireless communication a User Equipment (UE). The method generally includes deciding to spatially multiplex a Physical Uplink Shared Channel (PUSCH) and a Sounding Reference Signal (SRS) for simultaneous transmission via different sets of one or more antennas; determining that Uplink Control Information (UCI) is to be transmitted using resources assigned for the PUSCH, and that at least a portion of time and frequency resources for the PUSCH is to be used for transmission of the SRS; determining a resource mapping pattern for mapping the UCI to the PUSCH resources, wherein the resource mapping pattern avoids collision of the UCI with the SRS; mapping the UCI to the PUSCH resources based on the resource mapping pattern; and transmitting the spatially multiplexed PUSCH and the SRS after the mapping.

In an aspect, the mapping includes mapping at least a portion of UCI bits indicating acknowledgement/negative acknowledgement (ACK/NACK) using the PUSCH resources not to be used for the SRS.

In an aspect, the mapping includes, after mapping the at least a portion of the UCI bits indicating ACK/NACK, mapping a remaining portion of the UCI bits indicating ACK/NACK and at least a portion of the UCI bits indicating channel state indication (CSI) using the PUSCH resources to be used for SRS.

In an aspect, the mapping includes mapping UCI bits indicating acknowledgement/negative acknowledgement (ACK/NACK) before mapping the UCI bits indicating channel state indication (CSI).

Certain aspects provide a method for wireless communication by a Base Station (BS). The method generally includes indicating to a User Equipment (UE) that a Physical Uplink Control Channel (PUCCH) and a Sounding Reference Signal (SRS) are to be transmitted simultaneously within a same component carrier via different sets of one or more antennas at the UE; determining time and frequency resources for the PUCCH and the SRS to avoid collision of at least a portion of the PUCCH with the SRS; signaling the determined time and frequency resources to the UE; and receiving the spatially multiplexed PUCCH and SRS using the determined time and frequency resources.

In an aspect, the indicating includes configuring or scheduling the UE to transmit the PUCCH and the SRS in a same OFDM symbol.

In an aspect, the portion includes an uplink Demodulation Reference Signal (DMRS).

In an aspect, determining the time and frequency resources includes determining different time and frequency resources for the DMRS and the SRS.

In an aspect, the PUCCH is according to PUCCH Formats 1, 3 or 4.

In an aspect, determining the time and frequency resources includes determining that the SRS and the DMRS are to be received on different OFDM symbols.

In an aspect, determining the time and frequency resources includes determining the SRS is to be received on the same OFDM symbol in a different resource block than the DMRS.

In an aspect, determining the time and frequency resources includes determining the SRS is to be received on the same OFDM symbol and in a same resource block as the DMRS, wherein the SRS is scheduled on resource elements (REs) not scheduled for the DMRS.

In an aspect, the PUCCH is according to PUCCH Format 2.

In an aspect, determining the SRS is to be received on the same OFDM symbol in a same resource block as the DMRS.

In an aspect, determining the time and frequency resources includes determining a comb pattern for the SRS same as a comb pattern used for the DMRS; and determining the resources for the SRS based on the determined comb pattern on subcarriers not occupied by the DMRS.

In an aspect, determining the time and frequency resources includes determining that at least a remaining portion of the PUCCH and the SRS are to be transmitted by the UE on a same OFDM symbol of a same resource block.

In an aspect, determining the time and frequency resources includes determining the same OFDM symbol of the same resource block for receiving the remaining portion and the SRS if the SRS is at least one of X resource blocks wide or Y times wider than the PUCCH.

In an aspect, values of X and Y are based on at least one of a SRS use case or a format of the PUCCH.

In an aspect, the method further includes transmitting values of X and Y via Radio Resource Control (RRC) signaling to the UE.

In an aspect, determining the time and frequency resources further includes determining a puncturing pattern for the SRS; and determining the resources for the remaining portion by puncturing resource elements (REs) scheduled for the SRS based on the puncturing pattern.

In an aspect, the puncturing pattern is based on a format of the PUCCH.

In an aspect, the remaining portion includes uplink control information (UCI).

Certain aspects provide a method for wireless communication by a Base Station (BS). The method generally includes deciding that a Physical Uplink Shared Channel (PUSCH) and a Sounding Reference Signal (SRS) are to be spatially multiplexed for simultaneous transmission from a UE via different sets of one or more antennas at a UE; indicating the spatial multiplexing to the UE; detecting that Uplink Control Information (UCI) is to be received using resources assigned for the PUSCH, and that at least a portion of time and frequency resources for the PUSCH is to be used for receiving a Sounding Reference Signal (SRS); determining a resource mapping pattern for mapping the UCI to the PUSCH resources, wherein the resource mapping pattern avoids collision of the UCI with the SRS; and receiving the UCI based on the resource mapping pattern.

In an aspect, the resource mapping pattern includes mapping at least a portion of UCI bits indicating acknowledgement/negative acknowledgement (ACK/NACK) using the PUSCH resources not to be used for the SRS.

In an aspect, the resource mapping pattern includes, after mapping at least a portion of the UCI bits indicating ACK/NACK, mapping a remaining portion of the UCI bits indicating ACK/NACK and at least a portion of the UCI bits indicating channel state indication (CSI) using the PUSCH resources to be used for SRS.

In an aspect, the resource mapping pattern includes mapping UCI bits indicating acknowledgement before the UCI bits indicating channel state indication (CSI).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
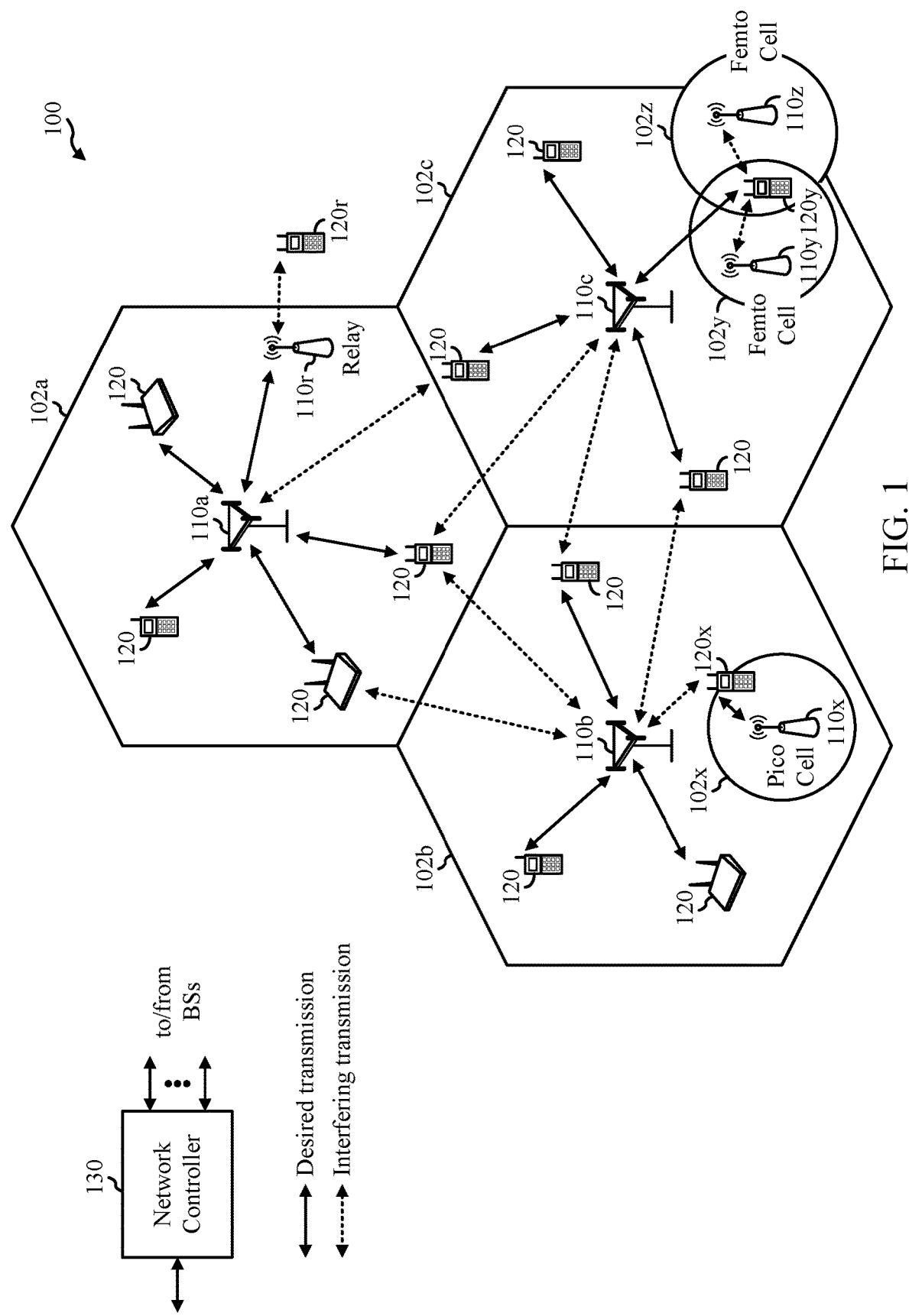
FIG. 1 is a block diagram conceptually illustrating an example telecommunications system, in accordance with certain aspects of the present disclosure.

One constraint for uplink transmissions in 5G NR (e.g., according to Release 15) is that a UE is allowed to transmit only one uplink channel at one time when the UE is assigned only one component carrier (CC). Multiple uplink channels (e.g., PUCCH, PUSCH, SRS, etc.) can only be Time Division Multiplexed (TDM) within one CC. The NR standards do not allow using any other multiplexing mechanism (e.g., Frequency Division Multiplexing, FDM, Code Division Multiplexing, CDM, etc.) to transmit multiple uplink channels at one time within one CC.

A problem with this constraint is that if the UE has multiple uplink channels configured to be transmitted at the same time, this leads to a collision of the channels. In such a case, the UE either has to drop one or more channels in favor of a particular channel or has to follow complicated rules to resolve the collision.

In certain aspects, future NR releases are likely to support multiple uplink transmit antennas/transmit chains at the UE. In certain aspects, having multiple transmit antennas/transmit chains allows a UE to transmit multiple uplink channels to a gNB simultaneously in the same time and frequency resources using spatial multiplexing within the same CC.

Certain aspects of the present disclosure discuss a design for spatially multiplexing two or more uplink control channels for UEs that support multiple uplink transmit antennas. For example, spatial multiplexing of SRS and PUCCH includes transmitting SRS using a first set of one or more UL antennas and transmitting PUCCH using a second set of one or more UL antennas different from the first set.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In a an aspect, each of the BSs 110 and each of the UEs 120 may be configured to perform operations related to spatially multiplexing PUCCH and SRS, according to aspects described herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
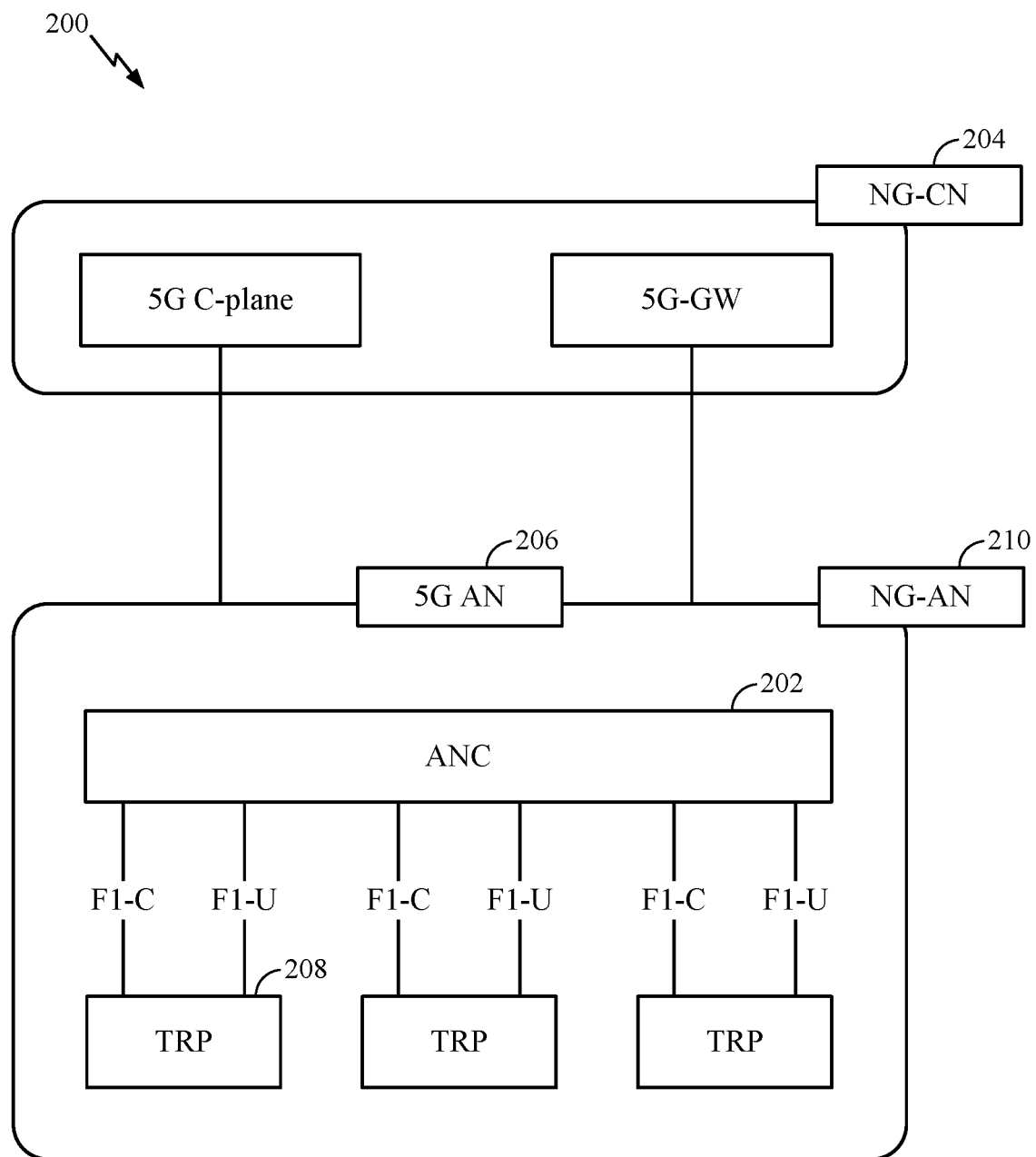
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
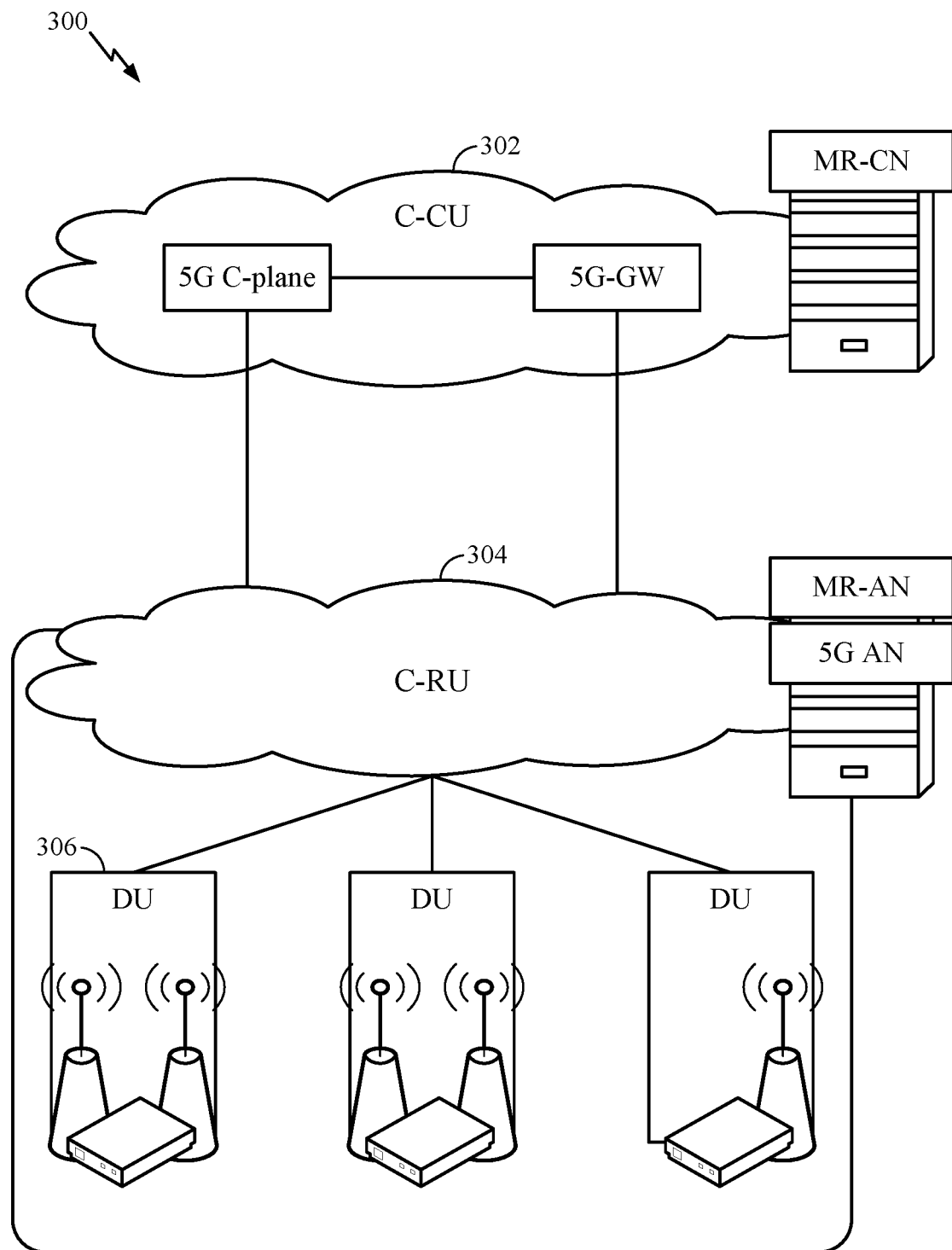
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
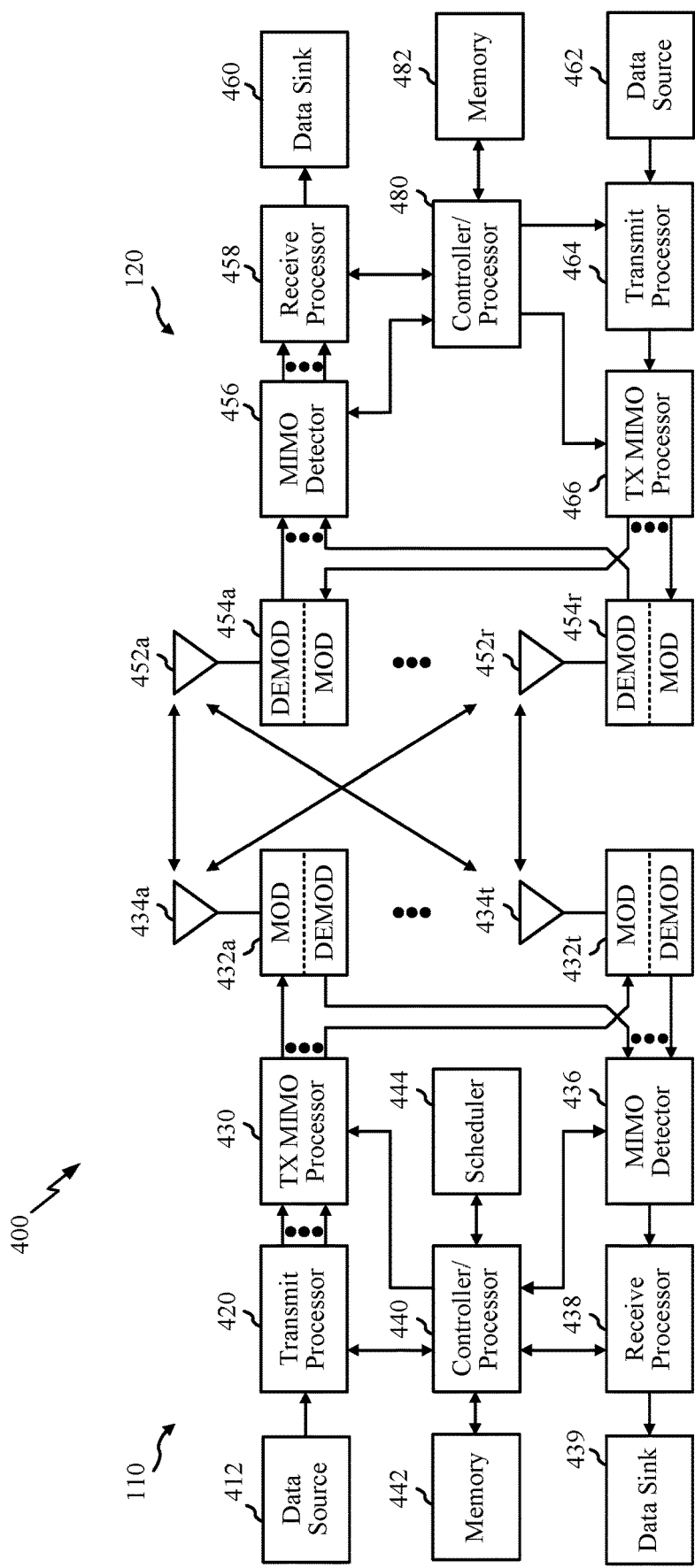
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein. In an aspect, the BS 110 and the UE 120 may be configured to perform operations relating to spatially multiplexing PUCCH and SRS, according to aspects described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
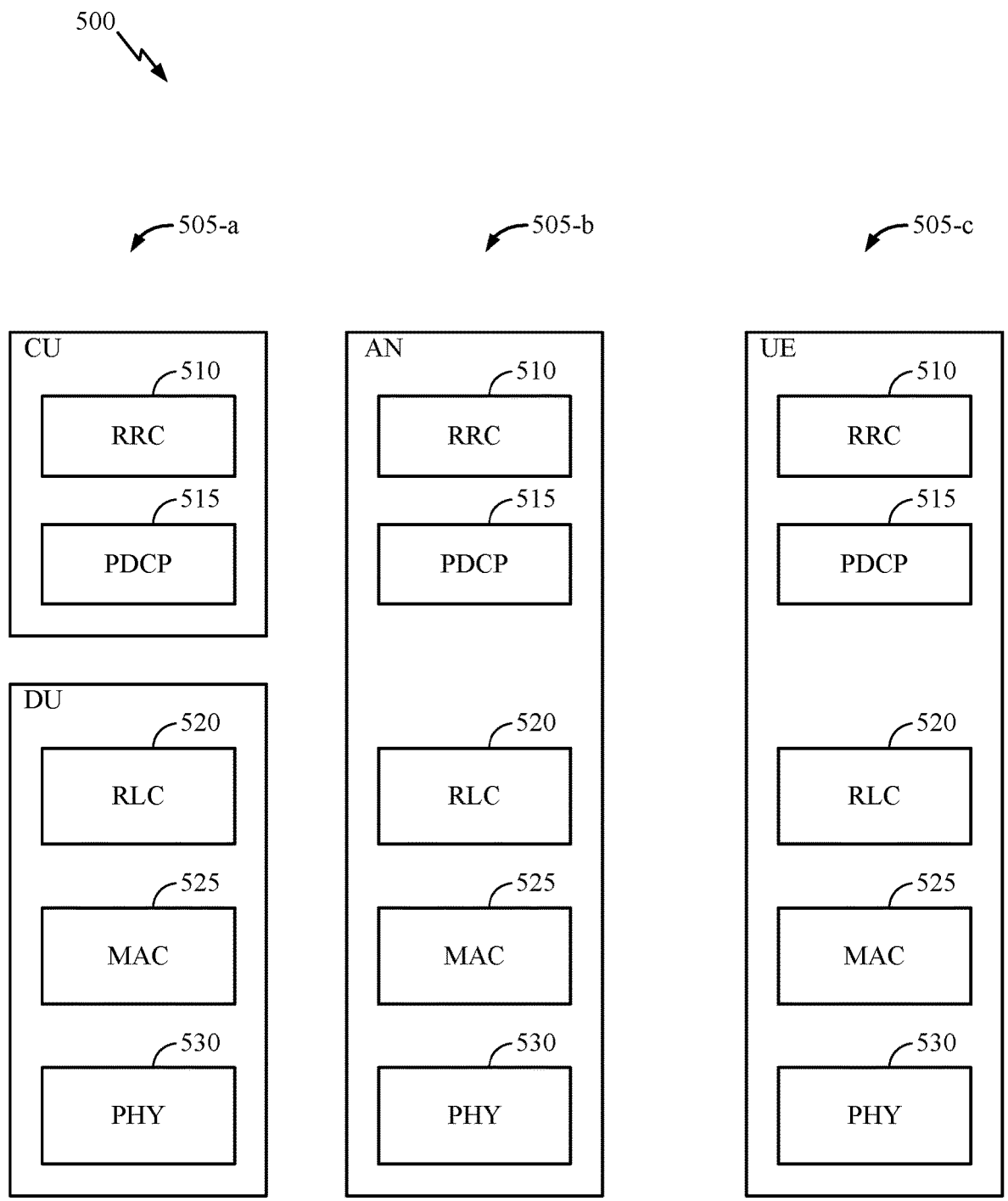
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
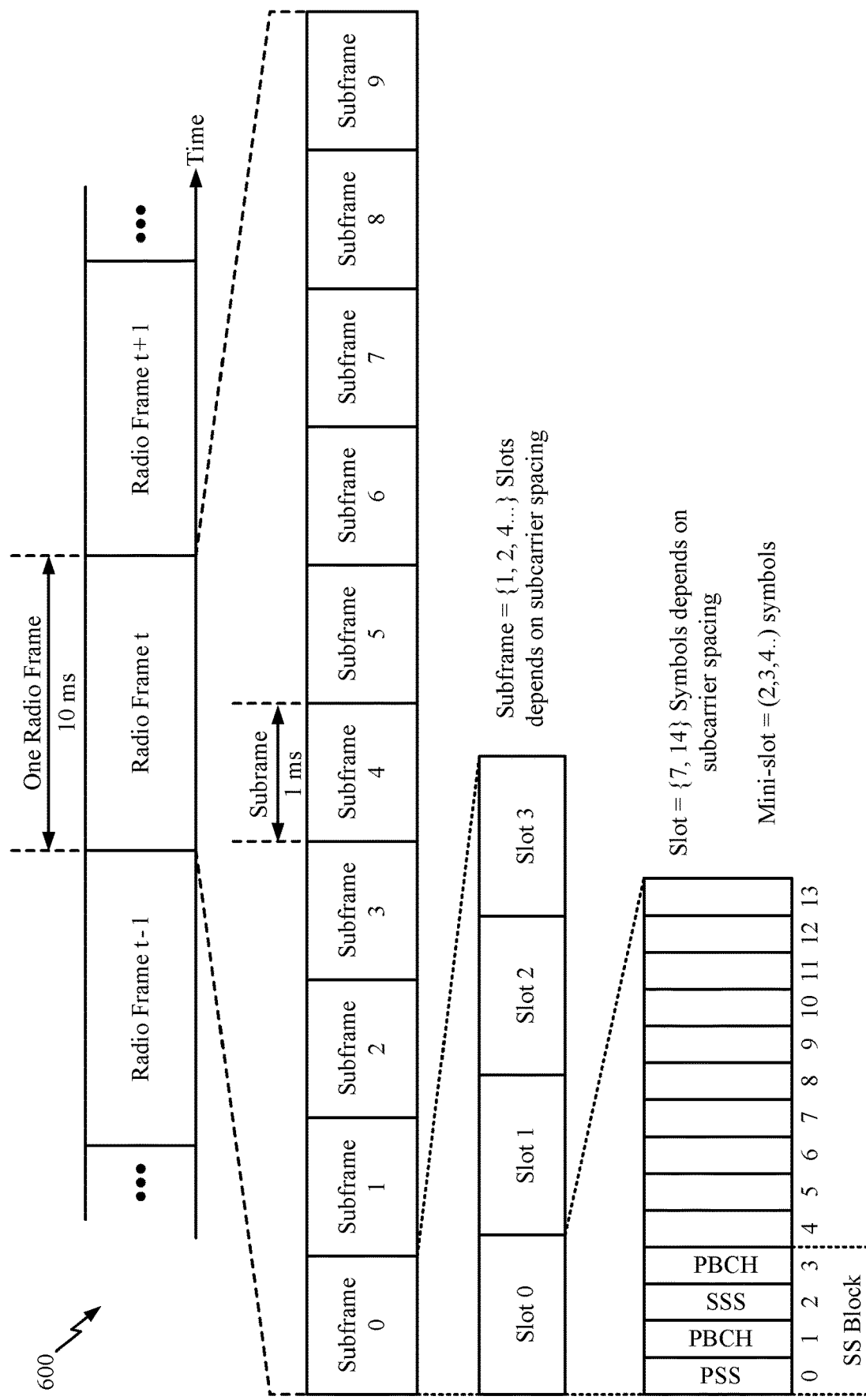
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping.

Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Design for Spatially Multiplexing
Physical Uplink Control Channel (PUCCH) and
Sounding Reference Signal (SRS)

One constraint for uplink transmissions in 5G NR (e.g., according to Release 15) is that a UE is allowed to transmit only one uplink channel at one time within one component carrier (CC). Multiple uplink channels (e.g., PUCCH, PUSCH, SRS, etc.) can only be Time Division Multiplexed (TDM) within one CC. The NR standards do not allow using any other multiplexing mechanism (e.g., Frequency Division Multiplexing, FDM, Code Division Multiplexing, CDM, etc.) to transmit multiple uplink channels at one time within one CC.

A problem with this constraint is that if the UE has multiple uplink channels configured or scheduled to be transmitted at the same time, this leads to a collision of the channels. In such a case, the UE either has to drop one or more channels in favor of a particular channel or has to follow complicated rules to resolve the collision.

In certain aspects, future NR releases are likely to support multiple uplink transmit antennas/transmit chains at the UE. In certain aspects, having multiple transmit antennas/transmit chains allows a UE to transmit multiple uplink channels to a gNB simultaneously in the same time and frequency resources using spatial multiplexing within the same CC.

Certain aspects of the present disclosure discuss a design for spatially multiplexing two or more uplink channels for UEs that support multiple uplink transmit antennas. For example, spatial multiplexing of SRS and PUCCH includes transmitting SRS using a first set of one or more UL antennas and transmitting PUCCH using a second set of one or more UL antennas different from the first set.

Figure 7A:
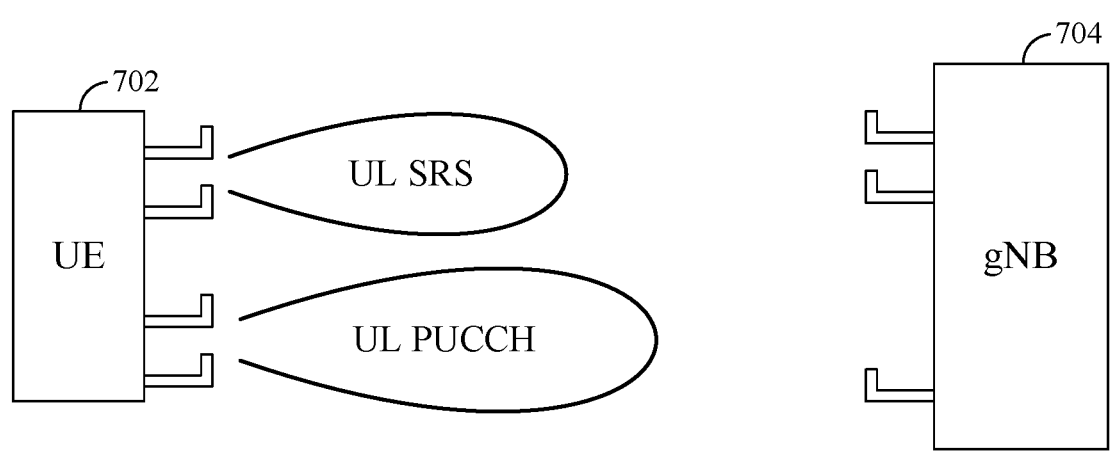
FIG. 7A illustrates spatially multiplexing UL SRS and UL PUCCH, in accordance with certain aspects of the present disclosure.

FIG. 7A illustrates spatially multiplexing UL SRS and UL PUCCH, in accordance with certain aspects of the present disclosure. As shown, the UE 702 has four antennas and transmits the UL SRS and the UL PUCCH to gNB 704 as separate spatially multiplexed streams. In an aspect, the UE may transmit the UL SRS using one or more of the four UE antennas and may transmit the UL PUCCH using one or more remaining antennas.

In certain aspects, PUCCH generally includes a portion assigned for Uplink Control Information (UCI) and a remaining portion assigned for Demodulation Reference Signal (DMRS). As noted in the following description, when spatially multiplexing SRS and PUCCH, it may be beneficial to avoid collision of resources (e.g., time/frequency resources) scheduled for SRS and DMRS.

Figure 7B:
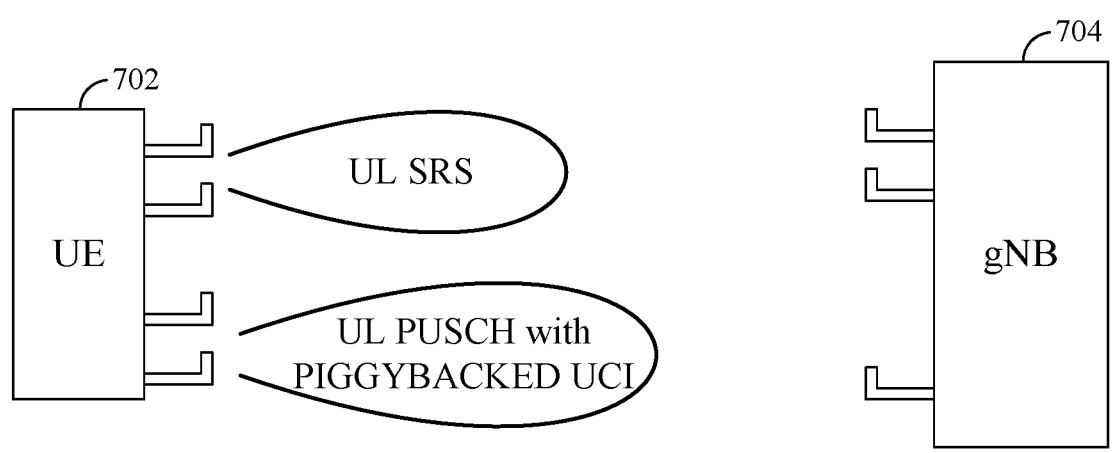
FIG. 7B illustrates spatially multiplexing UL SRS and UL PUSCH (including piggybacked UCI), in accordance with certain aspects of the present disclosure.

In certain aspects, when PUCCH and PUSCH are configured to be transmitted in the same one or more symbols, the standards allow UCI bits to be piggybacked on PUSCH resources, for example, by transmitting at least a portion of the UCI bits using PUSCH resources. FIG. 7B illustrates spatially multiplexing UL SRS and PUSCH (including piggybacked UCI), in accordance with certain aspects of the present disclosure. As shown, the UE 702 transmits the UL SRS and the UL PUSCH to gNB 704 as separate spatially multiplexed streams. In an aspect, the UE may transmit the UL SRS using one or more of the four UE antennas and may transmit the UL PUSCH using one or more remaining antennas. As noted in the following description, when spatially multiplexing SRS and PUSCH including piggybacked UCI, it may be beneficial to avoid collision of resources (e.g., time/frequency resources) scheduled for SRS and UCI. Further, as discussed in certain aspects, if collision of UCI and SRS is unavoidable, the UE attempts to at least avoid collision of ACK/NACK potion of the UCI with SRS.

The DMRS is generally used by the gNB for estimating UL channels between the UE and the gNB. In certain aspects, it may be beneficial to avoid collision of resources (e.g., time/frequency resources) scheduled for SRS and DMRS. In an aspect, as long as the gNB correctly receives and decodes the DMRS, it may separate out UCI and SRS based on the DMRS even if their respective resources collide. In certain aspects, when spatially multiplexing SRS and PUCCH (as shown in FIG. 7A), one or more rules may be defined to avoid collision of resources scheduled for SRS and the DMRS portion of PUCCH. In this context, collision of resources refers to two channels being scheduled on the same OFDM symbol and the same resource block (RB) and possibly the same resource elements (REs).

Figure 8:
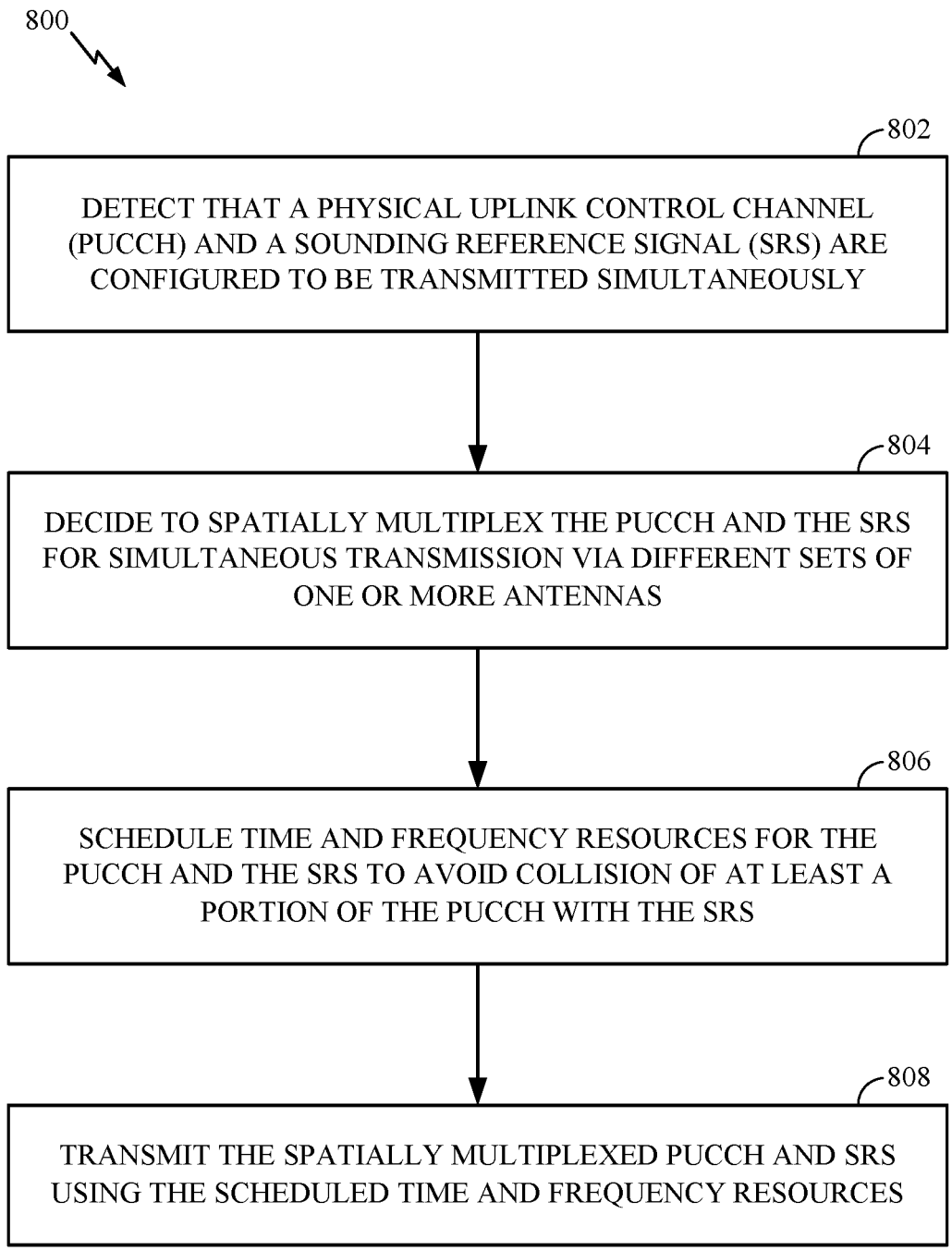
FIG. 8 illustrates example operations performed by a User Equipment (UE) for spatially multiplexing uplink channels, in accordance with certain aspects of the present disclosure.

FIG. 8 illustrates example operations 800 performed by a User Equipment (UE) for spatially multiplexing uplink channels, in accordance with certain aspects of the present disclosure. Operations 800 begin, at 802, by detecting that a PUCCH and a SRS are to be transmitted simultaneously. For example, the PUCCH and the SRS are configured (e.g., via RRC signaling) or scheduled (e.g., via DCI) to be transmitted in the same OFDM symbol. At 804, the UE decides to spatially multiplex the PUCCH and the SRS for simultaneous transmission via different sets of one or more antennas. In an aspect, the simultaneous transmission includes transmission in the same OFDM symbol. At 806, the UE determines time and frequency resources for transmission of the PUCCH and the SRS to avoid collision of at least a portion of the PUCCH with the SRS. In an aspect, the portion of the PUCCH includes DMRS. At 808, the UE transmits the spatially multiplexed PUCCH and the SRS using the determined time and frequency resources. In an aspect, determining the time and frequency resources includes determining different time and frequency resources for the DMRS and the SRS.

Figure 9:
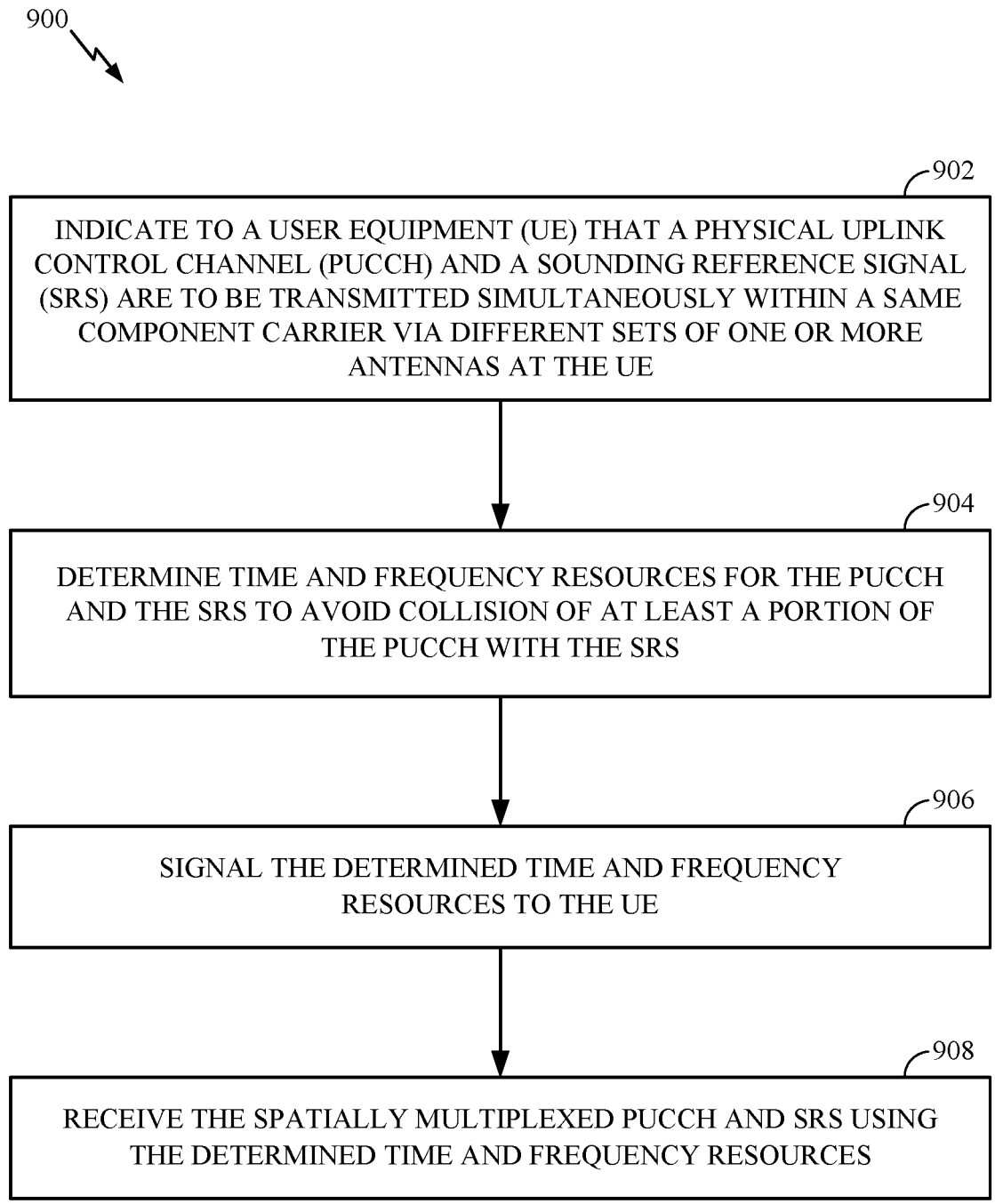
FIG. 9 illustrates example operations performed by a base station (BS) for spatially multiplexing uplink channels, in accordance with certain aspects of the present disclosure.

FIG. 9 illustrates example operations 900 performed by a base station (e.g., gNB) for spatially multiplexing uplink channels, in accordance with certain aspects of the present disclosure. Operations 900 begin, at 902, by indicating to a User Equipment (UE) that a Physical Uplink Control Channel (PUCCH) and a Sounding Reference Signal (SRS) are to be transmitted simultaneously within a same component carrier via different sets of one or more antennas at the UE. At 904, the BS determines time and frequency resources for the PUCCH and the SRS to avoid collision of at least a portion of the PUCCH with the SRS. In an aspect, the portion of the PUCCH includes DMRS. At 906, the BS signals the determined time and frequency resources to the UE. At 908, the BS receives the spatially multiplexed PUCCH and SRS using the determined time and frequency resources.

NR (e.g., in Release 15) defines five different formats for the PUCCH including PUCCH formats 0-4. PUCCH formats 1, 3, and 4 are generally configured to have four or more OFDM symbols and are often referred to as long PUCCH formats. In accordance with the current NR design, in PUCCH formats 1, 3, and 4, UCI and DMRS are always time division multiplexed. For example, UCI and DMRS are scheduled on alternate OFDM symbols. PUCCH formats 0 and 2 are generally configured to have 1 or 2 OFDM symbols and are often referred to as short PUCCH formats. In certain aspects, a separate set of rules may be defined for spatially multiplexing SRS with different PUCCH formats.

Spatially Multiplexing SRS with PUCCH Formats 1, 3 or 4

In certain aspects, when spatially multiplexing SRS and PUCCH formats 1, 3, or 4 and when the SRS and the PUCCH are configured or scheduled to be transmitted on the same symbol, SRS may not be allowed to collide with the DMRS portion of the PUCCH. As noted above, the DMRS is used by a gNB to estimate the uplink channels. Not allowing SRS to collide with DMRS helps protect the DMRS and may assist the channel estimation of the PUCCH at the gNB. In an aspect, the SRS is not allowed to be scheduled on resources (e.g., time and frequency resources) that are assigned for DMRS. For example, the SRS is not allowed to be scheduled on the same symbol of the same RB as the DMRS. In an aspect, if the DMRS is assigned a particular symbol of a given RB, SRS is allowed to be transmitted in the same symbol of a different RB. In an aspect, the SRS is not allowed to be transmitted in resource elements (REs) assigned to DMRS. However, SRS is allowed to be transmitted on different REs (not assigned to DMRS) of the same symbol in the same RB.

In certain aspects, SRS is allowed to collide with the UCI. For example, SRS is allowed to be scheduled on the same symbol of the same RB as the UCI. In an aspect, the SRS and UCI are allowed to be scheduled in the same REs of the same RB.

Spatially Multiplexing SRS with PUCCH Format 2

In certain aspects, when spatially multiplexing SRS and PUCCH format 2 and when the SRS and the PUCCH are configured or scheduled to be transmitted on the same symbol of the same RB, SRS is scheduled with the same comb pattern as the PUCCH and on subcarriers not scheduled for the DMRS. In an aspect, using the same comb pattern helps avoid collision of the SRS and the DMRS. In an aspect, when the SRS and the PUCCH format 2 are not configured or scheduled to be transmitted on the same symbol of the same RB, a nominal comb type is used for the SRS.

In certain aspects, the comb pattern is defined by the division of subcarriers between channels when the channels are frequency division multiplexed. For example, when UCI and DMRS are FDMed, in comb 3 DMRS occupies one third of the subcarriers and UCI occupies the remaining subcarriers. For example, in comb 3 the DMRS occupies subcarrier indices 1, 4, 7, 10 and so on and the UCI occupies the remaining subcarriers.

In comb 2 the DMRS occupies half of the subcarriers and the remaining subcarriers are occupied by UCI. In comb 4 the DMRS occupies one fourth of the subcarriers and the remaining subcarriers are occupied by UCI.

In accordance with NR standards (e.g., Release 15), PUCCH format 2 uses comb 3 and the nominal comb type for SRS is comb 2 or comb 4. Thus, in certain aspects, when the SRS and PUCCH format 2 are configured or scheduled to collide (e.g., configured or scheduled to be transmitted in the same symbol of the same RB), the UE changes the comb pattern of SRS to comb 3 to match the comb pattern of PUCCH format 2.

Figure 10:
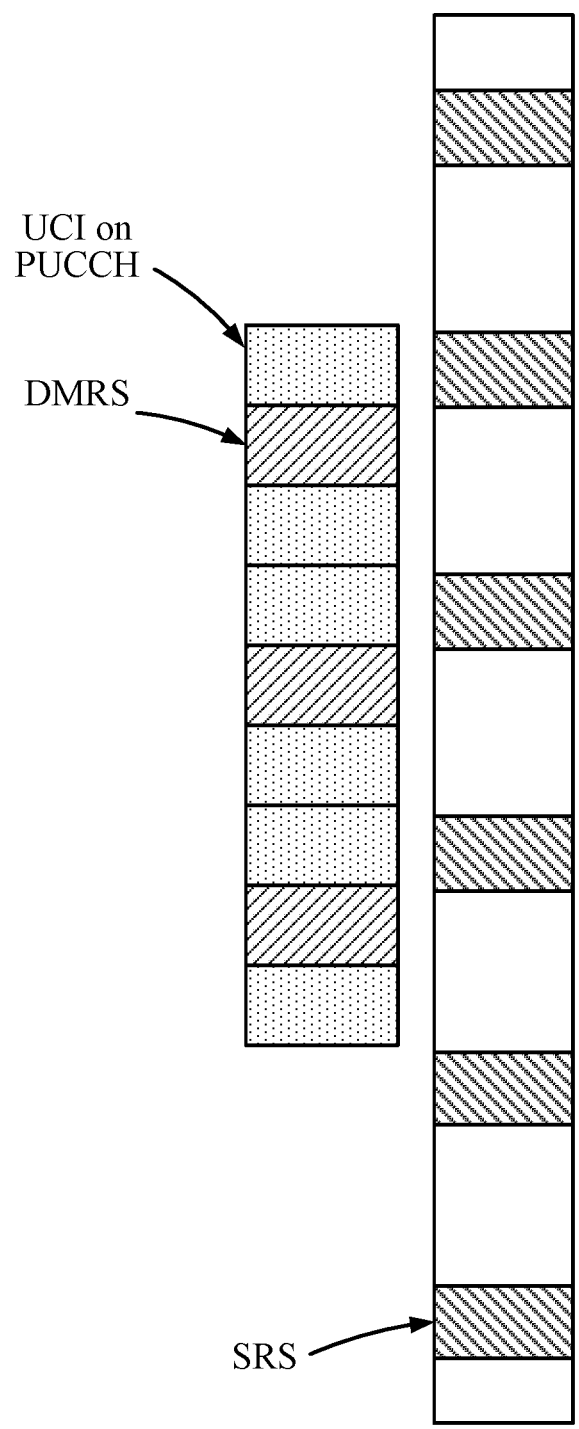
FIG. 10 illustrates spatially multiplexing SRS with PUCCH format 2, in accordance with certain aspects of the present disclosure.

FIG. 10 illustrates spatially multiplexing SRS with PUCCH format 2, in accordance with certain aspects of the present disclosure.

As shown, PUCCH format 2 uses comb pattern 3 for frequency division multiplexing UCI and DMRS in the same OFDM symbol, with the DMRS bits occupying one third of the subcarriers assigned for the PUCCH and the remaining two third subcarriers being occupied by UCI bits. The SRS is also scheduled on the same OFDM symbol as the PUCCH using comb pattern 3 with the SRS occupying one third of the subcarriers assigned for SRS and occupying subcarriers not occupied by DMRS. As shown, as a result of using the same comb pattern, the SRS does not collide with the DMRS portion of the PUCCH. However, as shown, the SRS collides with at least a portion of the UCI portion of the PUCCH.

In certain aspects, when spatially multiplexing SRS and PUCCH of any of the PUCCH formats 0-4, while the SRS may not be allowed to collide with the DMRS part of the PUCCH, the SRS may be allowed to collide with at least a portion of the UCI. As noted above, as long as the gNB correctly receives and decodes the DMRS and estimates the PUCCH based on the DMRS, it may separate out UCI and SRS even if their respective resources collide. Thus, it is beneficial to protect the DMRS over the UCI.

In certain aspects, rules may be defined when the SRS and the UCI portion of the PUCCH are configured to collide. In an aspect, when the SRS and the UCI portion of the PUCCH are configured or scheduled to be transmitted on the same symbol and the same RB, both the SRS and the PUCCH are scheduled and transmitted on the colliding resources only if the SRS is at least X RBs wide and/or Y times larger than the PUCCH size (e.g, in number of RBs).

In an aspect, the values of X and Y depend on the SRS use case. For example, the SRS use case may include codebook based SRS (when uplink transmissions are based on a precoder selected from a codebook), non-codebook based SRS (when the UE selects its own precoder for transmitting SRS), SRS with antenna switching (e.g., when UE transmits SRS on one antenna at a time). In an aspect, the values of X and Y depend on the PUCCH format. For example, the X and Y values may be larger if the PUCCH is using format 0 or 1, and the X and Y values may be smaller if the PUCCH is using format 2, 3 or 4. In an aspect, the values of X and Y may be RRC configured or implicitly derived at the UE.

In certain aspects, if the above conditions relating to the size of the SRS are not met, the SRS and the PUCCH are not allowed to collide. For example, one of the channels is dropped following nominal priority rules defined in NR (e.g., Release 15).

In certain aspects, when the PUCCH (or at least the UCI portion of the PUCCH) is configured to collide with SRS, the UE may schedule the PUCCH (or at least the UCI) by puncturing resources (e.g., REs) scheduled for the SRS based on a puncturing pattern. In an aspect, puncturing resources scheduled for the SRS incudes dropping SRS transmission on resources that overlap with the PUCCH (or at least UCI) and not dropping SRS on resources that do not overlap with PUCCH (or at least UCI). For example, assuming SRS is scheduled on 12 REs with signals s1,s2, . . . ,s12, and further assuming that 6 of the 12 REs are colliding with PUCCH transmission (e.g., the REs carrying s1, . . . ,s6 are colliding with PUCCH), in this case puncturing means that UE drops s1-s6 and transmits s7, . . . ,s12 (i.e., the remaining un-punctured signal on the non-overlapping REs). In an aspect, the puncturing pattern of the SRS may be RRC configured or included in DCI.

Additionally or alternatively, the puncturing pattern depends on the PUCCH format. For example, the UE punctures SRS resources if colliding with PUCCH formats 0 and 2, and does not puncture the SRS resources if colliding with PUCCH formats 1, 3, or 4.

In certain aspects, when the PUCCH (or at least the UCI portion of the PUCCH) is configured to collide with SRS, the UE may rate match the SRS around the PUCCH (or at least the UCI) transmission. For example, following the same example as used for explaining puncturing, rate matching means that, UE re-generates another SRS signal of length 6, e.g., a1, . . . ,a6 based on the new length of the SRS, and transmits a1, . . . ,a6 on the 6 non-overlapping REs.

In certain aspects, when PUCCH and PUSCH are configured to be transmitted in the same one or more symbols, the standards allow UCI bits to be piggybacked on PUSCH resources, for example, by transmitting at least a portion of the UCI bits using PUSCH resources. In certain aspects, when the UCI bits are piggybacked on PUSCH resources and the PUSCH collides with SRS (e.g., when SRS and PUSCH are spatially multiplexed as shown in FIG. 7B), the UE first maps UCI bits to PUSCH resources (e.g., symbols/REs) that do not collide with SRS to protect UCI. In an aspect, if there are not enough PUSCH resources that do not collide with SRS to convey all UCI bits, a remaining portion of the UCI bits may be mapped to PUSCH resources (e.g., symbols/REs) that collide with SRS. In an aspect, the UE first maps ACK/NACK bits and then maps CSI reports, in order to protect the ACK/NACK bits. For example, the UE maps the ACK/NACK bits and one portion of the CSI reports to PUSCH resources that do not collide with SRS, and maps the remaining portion of CSI reports to the PUSCH resources that collide with SRS. In an aspect, the PUSCH (including the piggybacked UCI) and the SRS are transmitted over different sets of antennas.

Figure 11:
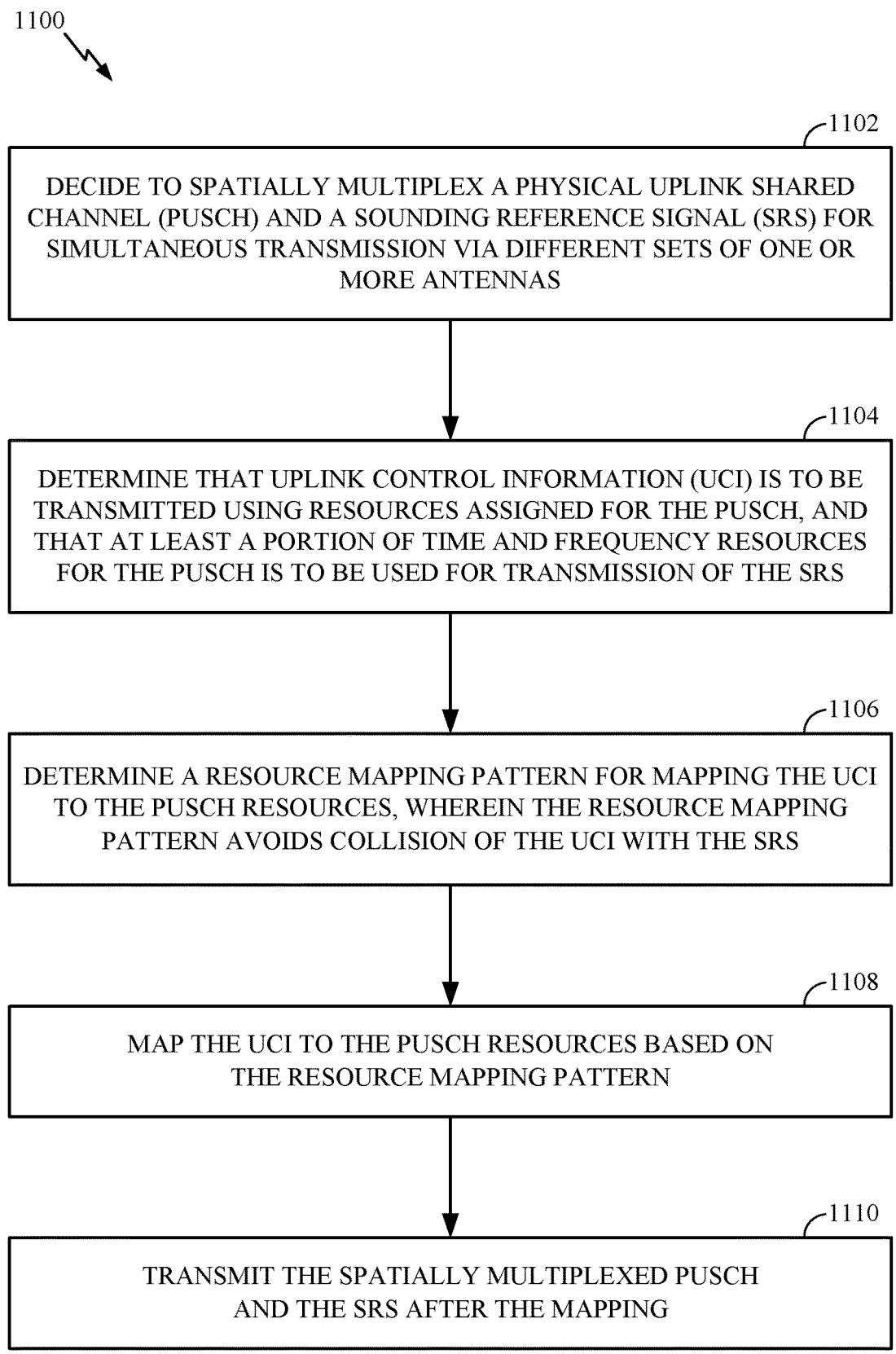
FIG. 11 illustrates example operations for mapping UCI to PUSCH resources when the PDSCH collides with SRS, in accordance with certain aspects of the present disclosure.

FIG. 11 illustrates example operations 1100 performed by a UE for mapping UCI to PUSCH resources when the PUSCH collides with SRS, in accordance with certain aspects of the present disclosure.

Operations 1100 begin, at 1102, by deciding to spatially multiplex a PUSCH and a SRS for simultaneous transmission via different sets of one or more antennas. At 1104, the UE determines that that Uplink Control Information (UCI) is to be transmitted using resources assigned for the PUSCH, and that at least a portion of time and frequency resources for the PUSCH is to be used for transmission of the SRS (e.g., SRS colliding with a portion of the PUSCH). At 1106, the UE determines a resource mapping pattern for mapping the UCI to the PUSCH resources, wherein the resource mapping pattern avoids collision of the UCI with the SRS. At 1108, the UE maps the UCI to the PUSCH resources based on the resource mapping pattern. At 1110, the UE transmits the spatially multiplexed PUSCH and the SRS after the mapping.

Figure 12:
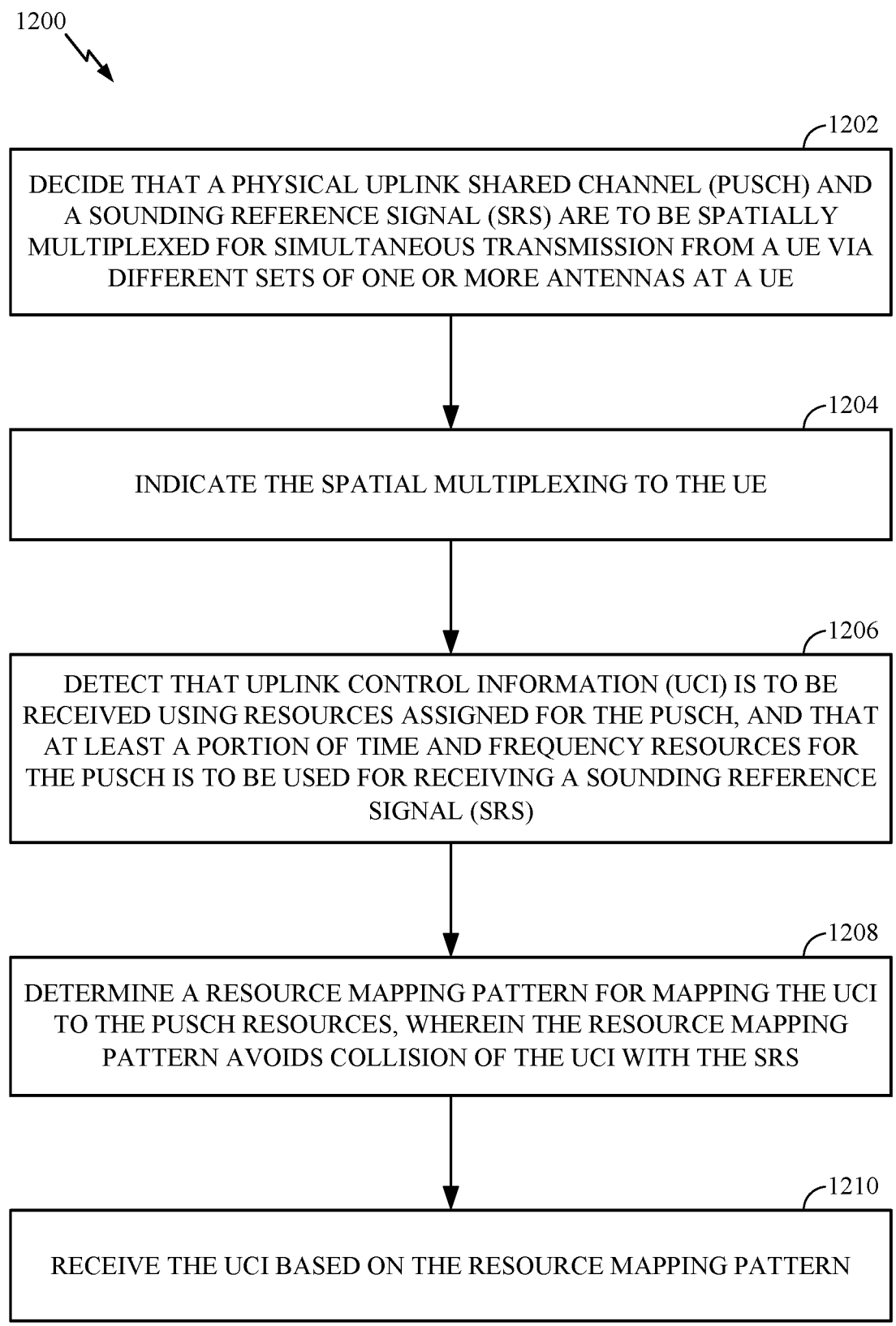
FIG. 12 illustrates example operations performed by a Base Station (BS) for mapping UCI to PUSCH resources when the PUSCH collides with SRS, in accordance with certain aspects of the present disclosure.

FIG. 12 illustrates example operations 1200 performed by a BS (e.g., gNB) for mapping UCI to PUSCH resources when the PUSCH collides with SRS, in accordance with certain aspects of the present disclosure.

Operations 1200 begin, at 1202, by deciding that a Physical Uplink Shared Channel (PUSCH) and a Sounding Reference Signal (SRS) are to be spatially multiplexed for simultaneous transmission from a UE via different sets of one or more antennas at a UE. At 1204, the BS indicates the spatial multiplexing to the UE. At 1206, the BS detects that Uplink Control Information (UCI) is to be received using resources assigned for the PUSCH, and that at least a portion of time and frequency resources for the PUSCH is to be used for receiving a Sounding Reference Signal (SRS). At 1208, the BS determines a resource mapping pattern for mapping the UCI to the PUSCH resources, wherein the resource mapping pattern avoids collision of the UCI with the SRS. At 1210, the BS receives the UCI based on the resource mapping pattern.

In an aspect, the resource mapping pattern includes first mapping a portion of the UCI bits using PUSCH resources not to be used for the SRS, and then mapping a remaining portion of the UCI bits using PUSCH resources to be used for SRS. In an aspect, the resource mapping pattern includes mapping the UCI bits indicating the ACK/NACK bits before the UCI bits indicating channel state indication (CSI), in order to protect ACK/NACK.

Figure 13:
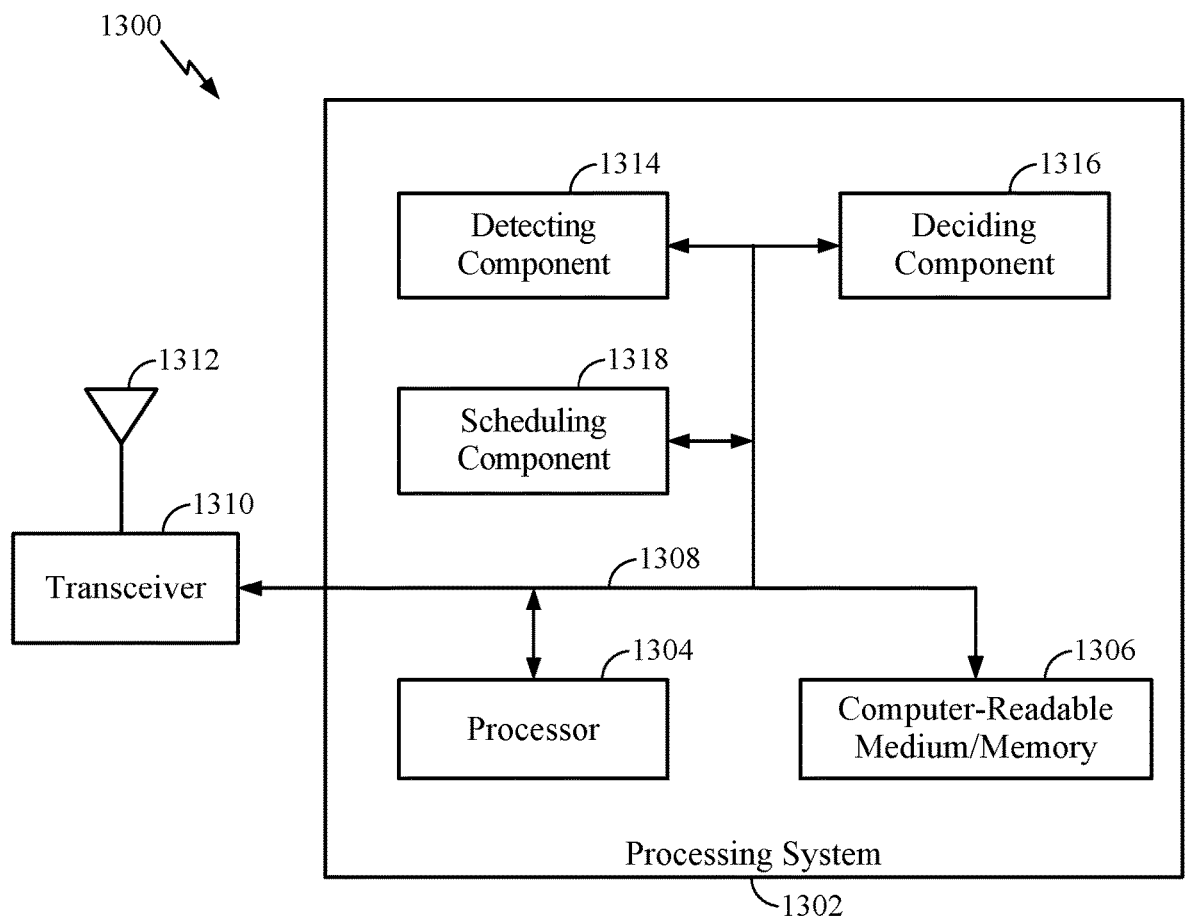
FIGS. 13-16 illustrate a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1310. The transceiver 1310 is configured to transmit and receive signals for the communications device 1300 via an antenna 1312, such as the various signals described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1306 via a bus 1308. In certain aspects, the computer-readable medium/ memory 1306 is configured to store computer-executable instructions that when executed by processor 1304, cause the processor 1304 to perform the operations illustrated in FIG. 8 or other operations for performing the various techniques discussed herein.

In certain aspects, the processing system 1302 further includes a detecting component 1314, a deciding component 1316, and a scheduling component 1318 for performing the operations illustrated in FIG. 8. In an aspect, the detecting component 1314 is configured to detect that a PUCCH and a SRS are configured to be transmitted simultaneously. The deciding component 1316 is configured to decide to spatially multiplex the PUCCH and the SRS for simultaneous transmission via different sets of one or more antennas. The scheduling component 1318 is configured to schedule time and frequency resources for the PUCCH and the SRS to avoid collision of at least a portion of the PUCCH (e.g., DMRS) with the SRS. The transceiver 1310 is configured to transmit the spatially multiplexed PUCCH and SRS using the scheduled time and frequency resources. The components 1314-1318 may be coupled to the processor 1304 via bus 1308. In certain aspects, the components 1314-1318 may be hardware circuits. In certain aspects, the components 1314-1318 may be software components that are executed and run on processor 1304.

Figure 14:
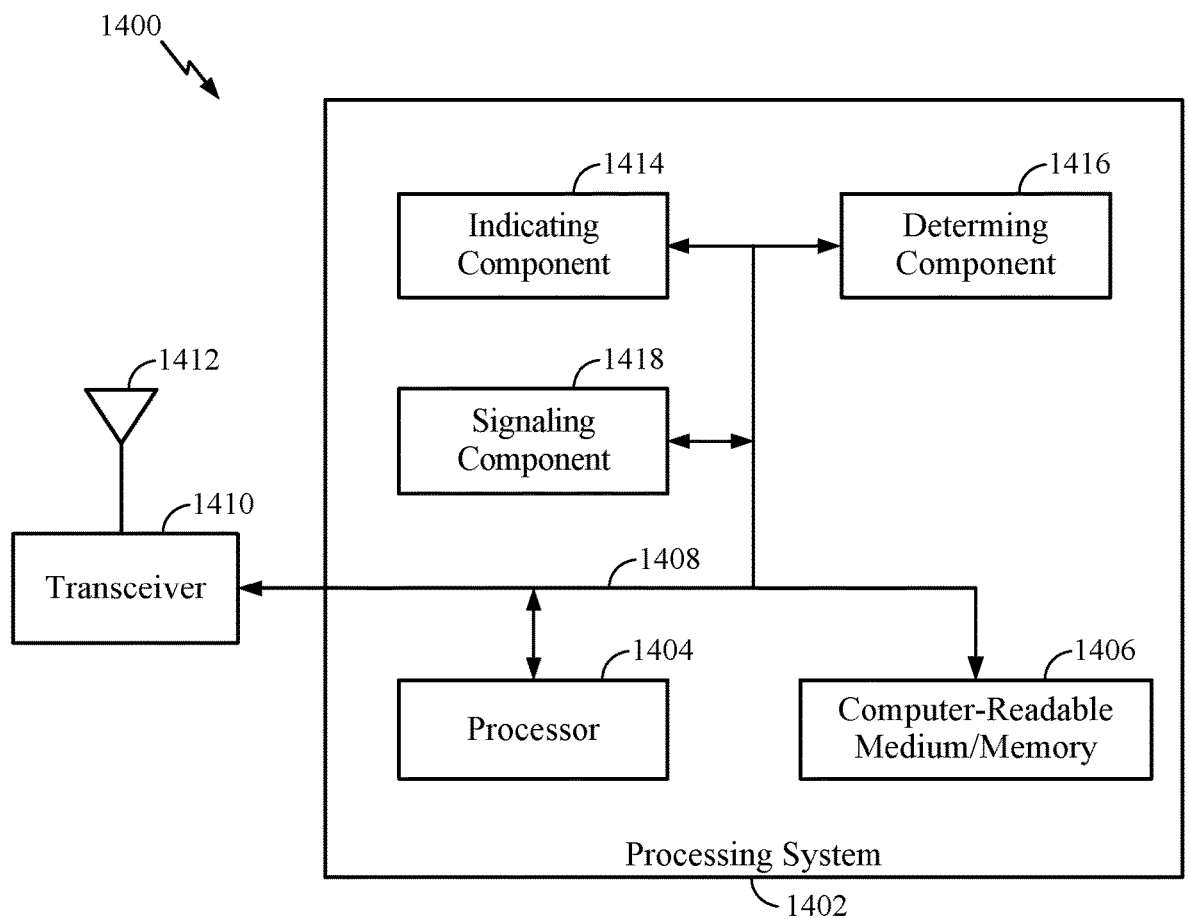

FIG. 14 illustrates a communications device 1400 that may include various components (e.g., corresponding to means-plus-function components) configured to perform operations for the techniques disclosed herein, such as the operations illustrated in FIG. 9. The communications device 1400 includes a processing system 1402 coupled to a transceiver 1410. The transceiver 1410 is configured to transmit and receive signals for the communications device 1400 via an antenna 1412, such as the various signals described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1406 via a bus 1408. In certain aspects, the computer-readable medium/ memory 1406 is configured to store computer-executable instructions that when executed by processor 1404, cause the processor 1404 to perform the operations illustrated in FIG. 9 or other operations for performing the various techniques discussed herein.

In certain aspects, the processing system 1402 further includes an indicating component 1414, a determining component 1416, and a signaling component 1418 for performing the operations illustrated in FIG. 9. In an aspect, the indicating component is configured to determine and indicate (e.g., using the transceiver 1410) to the UE that the PUCCH and the SRS are to be transmitted simultaneously. The determining component 1416 is configured to determine time and frequency resources for the PUCCH and the SRS to avoid collision of at least a portion of the PUCCH (e.g., DMRS) with the SRS. The signaling component 1418 is configured to signal (e.g., using the transceiver 1410) the determined time and frequency resources to the UE. The transceiver 1410 is configured to receive the spatially multiplexed PUCCH and the SRS using the determined time and frequency resources. The components 1414-1418 may be coupled to the processor 1404 via bus 1408. In certain aspects, the components 1414-1418 may be hardware circuits. In certain aspects, the components 1414-1418 may be software components that are executed and run on processor 1404.

Figure 15:
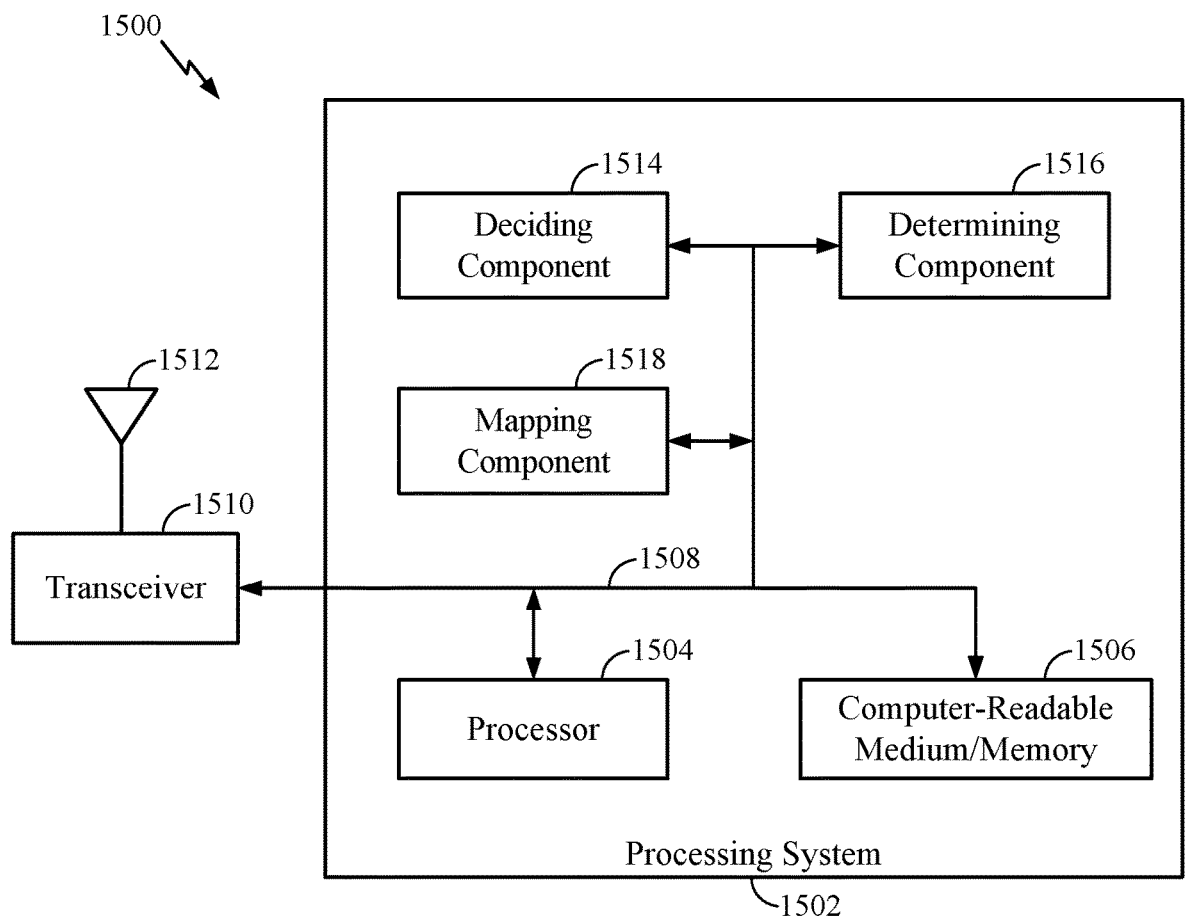

FIG. 15 illustrates a communications device 1500 that may include various components (e.g., corresponding to means-plus-function components) configured to perform operations for the techniques disclosed herein, such as the operations illustrated in FIG. 11. The communications device 1500 includes a processing system 1502 coupled to a transceiver 1510. The transceiver 1510 is configured to transmit and receive signals for the communications device 1500 via an antenna 1512, such as the various signals described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1506 via a bus 1508. In certain aspects, the computer-readable medium/memory 1506 is configured to store computer-executable instructions that when executed by processor 1504, cause the processor 1504 to perform the operations illustrated in FIG. 11 or other operations for performing the various techniques discussed herein.

In certain aspects, the processing system 1502 further includes a deciding component 1514, a determining component 1516, and a mapping component 1518 for performing the operations illustrated in FIG. 11. In an aspect, the deciding component 1514 is configured to decide to spatially multiplex a PUSCH and a SRS for simultaneous transmission via different sets of one or more antennas. The determining component 1516 is configured to determine that UCI is to be transmitted using resources assigned for the PUSCH, and that at least a portion of time and frequency resources for the PUSCH is to be used for transmission of the SRS. The determining component 1516 is further configured to determine a resource mapping pattern for mapping the UCI to the PUSCH resources, wherein the resource mapping pattern avoids collision of the UCI with the SRS. The mapping component 1518 is configured to map the UCI to the PUSCH resources based on the resource mapping pattern. The transceiver 1510 is configured to transmit the spatially multiplexed PUSCH and the SRS after the mapping. The components 1514-1518 may be coupled to the processor 1504 via bus 1508. In certain aspects, the components 1514-1518 may be hardware circuits. In certain aspects, the components 1514-1518 may be software components that are executed and run on processor 1504.

Figure 16:
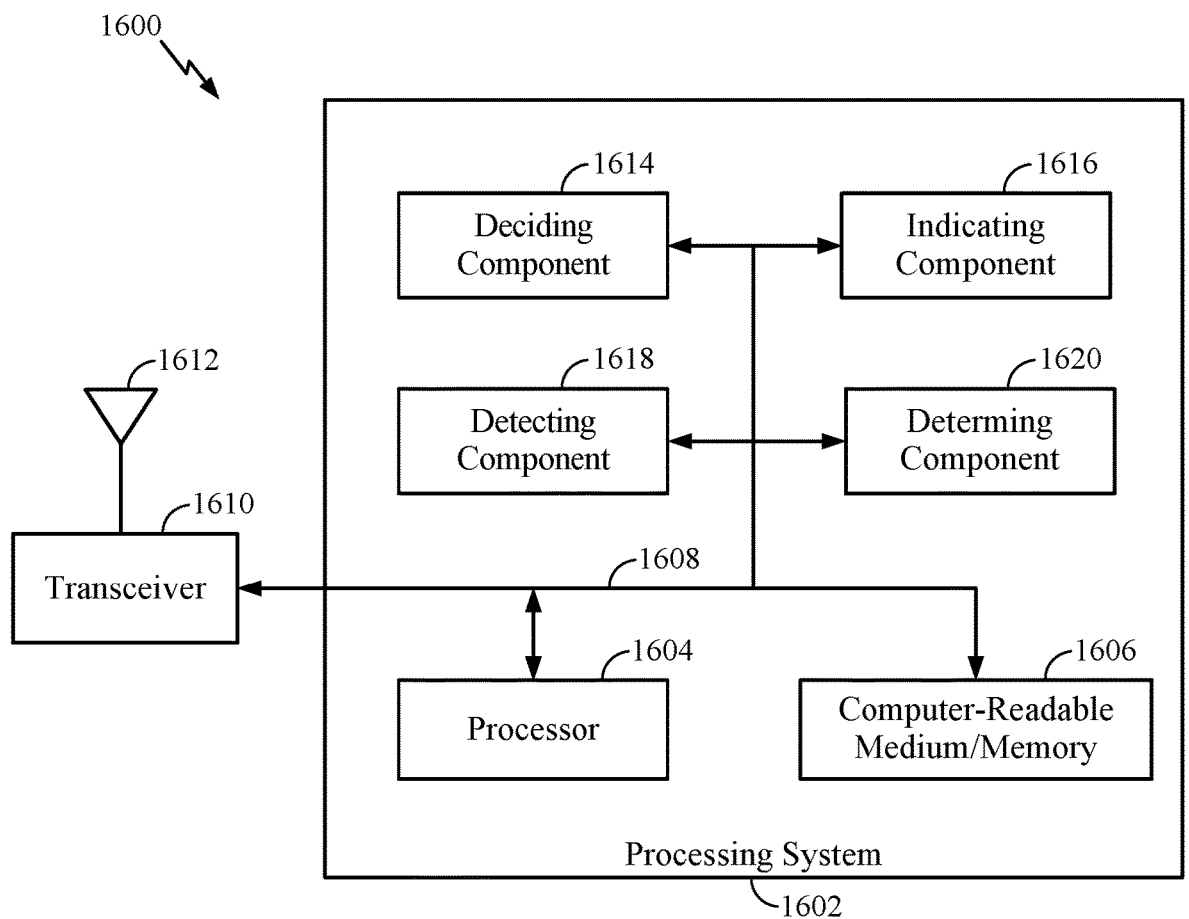

FIG. 16 illustrates a communications device 1600 that may include various components (e.g., corresponding to means-plus-function components) configured to perform operations for the techniques disclosed herein, such as the operations illustrated in FIG. 12. The communications device 1600 includes a processing system 1602 coupled to a transceiver 1610. The transceiver 1610 is configured to transmit and receive signals for the communications device 1600 via an antenna 1612, such as the various signals described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1606 via a bus 1608. In certain aspects, the computer-readable medium/ memory 1606 is configured to store computer-executable instructions that when executed by processor 1604, cause the processor 1604 to perform the operations illustrated in FIG. 12 or other operations for performing the various techniques discussed herein.

In certain aspects, the processing system 1602 further includes a deciding component 1614, an indicating component 1616, a detecting component 1618, and a determining component 1620 for performing the operations illustrated in FIG. 12. In an aspect, the deciding component 1614 is configured to decide that a PUSCH and a SRS are to be spatially multiplexed for simultaneous transmission from a UE via different set of one or more antennas at a UE. The indicating component 1616 is configured to indicate the spatial multiplexing to the UE. The detecting component 1618 is configured to detect that UCI is to be received using resources assigned for the PUSCH, and that at least a portion of time and frequency resources for the PUSCH is to be used for receiving a SRS. The determining component 1620 is configured to determine a resource mapping pattern for mapping the UCI to the PUSCH resources, wherein the resource mapping pattern avoids collision of the UCI with the SRS. The transceiver is configured to receive the UCI based on the resource mapping pattern. The components 1614-1620 may be coupled to the processor 1604 via bus 1608. In certain aspects, the components 1614-1620 may be hardware circuits. In certain aspects, the components 1614-1620 may be software components that are executed and run on processor 1604.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9 and 11-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
    receiving signaling indicating that a Physical Uplink Control Channel (PUCCH) and a Sounding Reference Signal (SRS) are to be transmitted simultaneously;
    selecting time and frequency resources for the PUCCH and the SRS to avoid collision of at least a portion of the PUCCH with the SRS, wherein selecting the time and frequency resources comprises selecting subcarriers for transmitting the SRS that are not used for transmission of a demodulation reference signal (DMRS) on the PUCCH; and
    transmitting, via spatial multiplexing, the PUCCH and SRS simultaneously via different sets of one or more antennas using the selected time and frequency resources.

2. The method of claim 1, wherein receiving signaling indicating that the PUCCH and the SRS are to be transmitted simultaneously comprises receiving signaling indicating that the PUCCH and the SRS are configured or scheduled to be transmitted in a same OFDM symbol.

3. The method of claim 1, wherein the portion includes a Demodulation Reference Signal (DMRS).

4. The method of claim 3, wherein selecting the time and frequency resources includes selecting different time and frequency resources for the DMRS and the SRS.

5. The method of claim 4, wherein the PUCCH is formatted according to PUCCH Formats 1, 3 or 4.

6. The method of claim 5, wherein selecting the time and frequency resources includes determining that the SRS and the DMRS are to be transmitted on different OFDM symbols.

7. The method of claim 5, wherein selecting the time and frequency resources includes determining the SRS is to be transmitted on a same OFDM symbol in a different resource block than the DMRS.

8. The method of claim 5, wherein selecting the time and frequency resources includes determining the SRS is to be transmitted on a same OFDM symbol and in a same resource block as the DMRS, wherein the SRS is scheduled on resource elements (REs) not scheduled for the DMRS.

9. The method of claim 4, wherein the PUCCH is formatted according to PUCCH Format 2, and wherein selecting the time and frequency resources includes detecting the SRS is to be transmitted on the same OFDM symbol in a same resource block as the DMRS.

10. The method of claim 1, wherein selecting the time and frequency resources includes:
    determining a comb pattern for the SRS same as a comb pattern used for the DMRS; and
    determining the resources for the SRS based on the determined comb pattern.

11. The method of claim 1, wherein selecting the time and frequency resources includes detecting that at least a remaining portion of the PUCCH and the SRS are configured to be transmitted on a same OFDM symbol of a same resource block.

12. The method of claim 11, wherein selecting the time and frequency resources includes determining the same OFDM symbol of the same resource block for transmission of the remaining portion and the SRS if the SRS is at least one of X resource blocks wide or Y times wider than the PUCCH.

13. The method of claim 12, wherein values of X and Y are determined based on at least one of an SRS use case or a format of the PUCCH.

14. The method of claim 12, wherein values of X and Y are configured via Radio Resource Control (RRC) signaling.

15. The method of claim 12, wherein selecting the time and frequency resources further includes:
    determining a puncturing pattern for the SRS; and
    determining the resources for the remaining portion by puncturing resource elements (REs) scheduled for the SRS based on the puncturing pattern.

16. The method of claim 15, wherein the puncturing pattern is based on a format of the PUCCH.

17. The method of claim 12, wherein selecting the time and frequency resources further includes rate matching transmission of the SRS around transmission of the remaining portion.

18. The method of claim 11, wherein the remaining portion includes uplink control information (UCI).

19. A method for wireless communication by a Base Station (BS), comprising:
    transmitting signaling to a User Equipment (UE) indicating that a spatially multiplexed Physical Uplink Control Channel (PUCCH) and a Sounding Reference Signal (SRS) are to be transmitted simultaneously within a same component carrier via different sets of one or more antennas at the UE;
    identifying time and frequency resources for the PUCCH and the SRS to avoid collision of at least a portion of the PUCCH with the SRS, wherein the identifying the time and frequency resources comprises identifying subcarriers for transmission of the SRS that are not used for transmission of a demodulation reference signal (DMRS) portion of the PUCCH;
    transmitting signaling indicating the identified time and frequency resources to the UE; and
    receiving the spatially multiplexed PUCCH and SRS using the identified time and frequency resources.

20. The method of claim 19, wherein transmitting signaling to the UE includes configuring or scheduling the UE to transmit the PUCCH and the SRS in a same OFDM symbol.

21. The method of claim 19, wherein the portion includes an uplink Demodulation Reference Signal (DMRS).

22. The method of claim 21, wherein identifying the time and frequency resources includes determining different time and frequency resources for the DMRS and the SRS.

23. The method of claim 22, wherein the PUCCH is formatted according to PUCCH Formats 1, 3 or 4.

24. The method of claim 23, wherein identifying the time and frequency resources includes determining that the SRS and the DMRS are to be transmitted on different OFDM symbols.

25. The method of claim 23, wherein identifying the time and frequency resources includes determining the SRS is to be transmitted on a same OFDM symbol in a different resource block than the DMRS.

26. The method of claim 23, wherein identifying the time and frequency resources includes determining the SRS is to be transmitted on a same OFDM symbol and in a same resource block as the DMRS, wherein the SRS is scheduled on resource elements (REs) not scheduled for the DMRS.

27. The method of claim 23, wherein the PUCCH is formatted according to PUCCH Format 2, and wherein identifying the time and frequency resources includes configuring or scheduling the UE to transmit the SRS on a same OFDM symbol in a same resource block as the DMRS.

28. The method of claim 19, wherein identifying the time and frequency resources includes configuring or scheduling the UE to transmit at least a remaining portion of the PUCCH and the SRS on a same OFDM symbol of a same resource block.

29. An apparatus for wireless communications by a user equipment (UE), comprising:
a processor configured to:
receive signaling indicating that a Physical Uplink Control Channel (PUCCH) and a Sounding Reference Signal (SRS) are to be transmitted simultaneously;
select time and frequency resources for the PUCCH and the SRS to avoid collision of at least a portion of the PUCCH with the SRS, wherein the selected time and frequency resources include subcarriers for transmitting the SRS that are not used for transmission of a demodulation reference signal (DMRS) on the PUCCH; and
transmit, via spatial multiplexing, the PUCCH and SRS simultaneously via different sets of one or more antennas using the selected time and frequency resources; and
a memory.

30. The apparatus of claim 29, wherein in order to receive signaling indicating that the PUCCH and the SRS are to be transmitted simultaneously, the processor is configured to receive signaling indicating that the PUCCH and the SRS are configured or scheduled to be transmitted in a same OFDM symbol.

31. The apparatus of claim 29, wherein the portion includes a Demodulation Reference Signal (DMRS).

32. The apparatus of claim 31, wherein in order to select the time and frequency resources, the processor is configured to select different time and frequency resources for the DMRS and the SRS.

33. The apparatus of claim 32, wherein the PUCCH is formatted according to PUCCH Formats 1, 3 or 4.

34. The apparatus of claim 33, wherein in order to select the time and frequency resources, the processor is configured to determine that the SRS and the DMRS are to be transmitted on different OFDM symbols.

35. The apparatus of claim 33, wherein in order to select the time and frequency resources, the processor is configured to determine the SRS is to be transmitted on a same OFDM symbol in a different resource block than the DMRS.

36. The apparatus of claim 33, wherein in order to select the time and frequency resources, the processor is configured to determine the SRS is to be transmitted on a same OFDM symbol and in a same resource block as the DMRS, wherein the SRS is scheduled on resource elements (REs) not scheduled for the DMRS.

37. The apparatus of claim 32, wherein the PUCCH is formatted according to PUCCH Format 2, and wherein in order to select the time and frequency resources, the processor is configured to detect the SRS is to be transmitted on the same OFDM symbol in a same resource block as the DMRS.

38. The apparatus of claim 29, wherein in order to select the time and frequency resources, the processor is configured to:
determine a comb pattern for the SRS same as a comb pattern used for the DMRS; and
determine the resources for the SRS based on the determined comb pattern.

39. The apparatus of claim 29, wherein in order to select the time and frequency resources, the processor is configured to detect that at least a remaining portion of the PUCCH and the SRS are configured to be transmitted on a same OFDM symbol of a same resource block.

40. The apparatus of claim 39, wherein in order to select the time and frequency resources, the processor is configured to determine the same OFDM symbol of the same resource block for transmission of the remaining portion and the SRS if the SRS is at least one of X resource blocks wide or Y times wider than the PUCCH.

41. The apparatus of claim 40, wherein values of X and Y are determined based on at least one of an SRS use case or a format of the PUCCH.

42. The apparatus of claim 40, wherein values of X and Y are configured via Radio Resource Control (RRC) signaling.

43. The apparatus of claim 40, wherein in order to select the time and frequency resources, the processor is further configured to:
determine a puncturing pattern for the SRS; and
determine the resources for the remaining portion by puncturing resource elements (REs) scheduled for the SRS based on the puncturing pattern.

44. The apparatus of claim 43, wherein the puncturing pattern is based on a format of the PUCCH.

45. The apparatus of claim 40, wherein in order to select the time and frequency resources, the processor is further configured to include rate matching transmission of the SRS around transmission of the remaining portion.

46. The apparatus of claim 39, wherein the remaining portion includes uplink control information (UCI).

47. An apparatus for wireless communications by a Base Station (BS), comprising:
a processor configured to:
transmit signaling to a User Equipment (UE) indicating that a spatially multiplexed Physical Uplink Control Channel (PUCCH) and a Sounding Reference Signal (SRS) are to be transmitted simultaneously within a same component carrier via different sets of one or more antennas at the UE;

identify time and frequency resources for the PUCCH and the SRS to avoid collision of at least a portion of the PUCCH with the SRS, wherein to identify the time and frequency resources, the processor is configured to identify subcarriers for transmission of the SRS that are not used for transmission of a demodulation reference signal (DMRS) portion of the PUCCH;

signal the identified time and frequency resources to the UE; and receive the spatially multiplexed PUCCH and SRS using the identified time and frequency resources; and a memory.

48. The apparatus of claim 47, wherein in order to transmit signaling to the UE, the processor is configured to configure or schedule the UE to transmit the PUCCH and the SRS in a same OFDM symbol.

49. The apparatus of claim 47, wherein the portion includes an uplink Demodulation Reference Signal (DMRS).

50. The apparatus of claim 49, wherein in order to identify the time and frequency resources, the processor is configured to determine different time and frequency resources for the DMRS and the SRS.

51. The apparatus of claim 50, wherein the PUCCH is formatted according to PUCCH Formats 1, 3 or 4.

52. The apparatus of claim 51, wherein in order to identify the time and frequency resources, the processor is configured to determine that the SRS and the DMRS are to be transmitted on different OFDM symbols.

53. The apparatus of claim 51, wherein in order to identify the time and frequency resources, the processor is configured to determine the SRS is to be transmitted on a same OFDM symbol in a different resource block than the DMRS.

54. The apparatus of claim 51, wherein in order to identify the time and frequency resources, the processor is configured to determine the SRS is to be transmitted on a same OFDM symbol and in a same resource block as the DMRS, wherein the SRS is scheduled on resource elements (REs) not scheduled for the DMRS.

55. The apparatus of claim 51, wherein the PUCCH is formatted according to PUCCH Format 2, and wherein in order to identify the time and frequency resources, the processor is configured to configure or schedule the UE to transmit the SRS on a same OFDM symbol in a same resource block as the DMRS.

56. The apparatus of claim 47, wherein in order to identify the time and frequency resources, the processor is configured to configure or schedule the UE to transmit at least a remaining portion of the PUCCH and the SRS on a same OFDM symbol of a same resource block.

* * * * *